United States Patent
Wang et al.

(10) Patent No.: US 9,606,911 B2
(45) Date of Patent: Mar. 28, 2017

(54) APPARATUSES FOR MANAGING AND ACCESSING FLASH MEMORY MODULE

(71) Applicant: SILICON MOTION, INC., Zhubei, Hsinchu County (TW)

(72) Inventors: Chi-Lung Wang, Zhubei (TW); Chia-Hsin Chen, Taichung (TW); Chien-Cheng Lin, Yilan (TW)

(73) Assignee: SILICON MOTION, INC., Zhubei (TW)

( * ) Notice: Subject to any disclaimer, the term of this patent is extended or adjusted under 35 U.S.C. 154(b) by 527 days.

(21) Appl. No.: 13/942,380

(22) Filed: Jul. 15, 2013

(65) Prior Publication Data

US 2013/0304975 A1 Nov. 14, 2013

Related U.S. Application Data

(62) Division of application No. 13/113,376, filed on May 23, 2011.

(60) Provisional application No. 61/347,500, filed on May 24, 2010.

(51) Int. Cl.
*G06F 12/00* (2006.01)
*G06F 12/02* (2006.01)
*G06F 12/10* (2016.01)

(52) U.S. Cl.
CPC .......... *G06F 12/0246* (2013.01); *G06F 12/10* (2013.01); *G06F 2212/7201* (2013.01)

(58) Field of Classification Search
USPC .......................................... 711/103, 170, 126
See application file for complete search history.

(56) References Cited

U.S. PATENT DOCUMENTS

| | | | | |
|---|---|---|---|---|
| 4,757,438 A * | 7/1988 | Thatte et al. | | 718/100 |
| 5,257,361 A * | 10/1993 | Doi et al. | | 711/207 |
| 5,392,416 A * | 2/1995 | Doi et al. | | 711/3 |
| 5,784,706 A * | 7/1998 | Oberlin et al. | | 711/202 |
| 6,625,713 B2 * | 9/2003 | Iida et al. | | 711/206 |
| 7,254,668 B1 * | 8/2007 | Chang et al. | | 711/103 |
| 7,475,185 B2 * | 1/2009 | Nakanishi et al. | | 711/103 |
| 7,526,599 B2 * | 4/2009 | Chang et al. | | 711/103 |
| 7,664,906 B2 * | 2/2010 | Chung et al. | | 711/103 |
| 7,779,426 B2 * | 8/2010 | Rogers et al. | | 719/321 |
| 7,970,981 B2 * | 6/2011 | Cheon et al. | | 711/103 |
| 8,438,325 B2 * | 5/2013 | Reid et al. | | 711/103 |

(Continued)

*Primary Examiner* — Reginald Bragdon
*Assistant Examiner* — Hannah A Faye-Joyner
(74) *Attorney, Agent, or Firm* — Birch, Stewart, Kolasch & Birch, LLP

(57) ABSTRACT

A method for maintaining address mapping for a flash memory module is disclosed including: recording a first set of addresses corresponding to a first set of sequential logical addresses in a first section of a first addressing block; recording a second set of addresses corresponding to a second set of sequential logical addresses in a second section of the first addressing block; recording a third set of addresses corresponding to a third set of sequential logical addresses in a first section of a second addressing block; and recording a fourth set of addresses corresponding to a fourth set of sequential logical addresses in a second section of the second addressing block; wherein the second set of logical addresses is successive to the first set of logical addresses, and the third set of logical addresses is successive to the second set of logical addresses.

11 Claims, 29 Drawing Sheets

(56) References Cited

U.S. PATENT DOCUMENTS

2008/0140915 A1* 6/2008 Ju et al. .................. 711/103
2008/0229025 A1* 9/2008 Plamondon ............. 711/126
2010/0312948 A1* 12/2010 Yano et al. .............. 711/103

* cited by examiner

| Logical address | Physical address |
|---|---|
| 0 | DB:#23, P:#4 |
| 1 | DB:#3708, P:#71 |
| ⋮ | ⋮ |
| 2047 | DB:#4, P:#115 |
| 2048 | DB:#1, P:#34 |
| ⋮ | ⋮ |
| 4095 | DB:#2351, P:#37 |
| ⋮ | ⋮ |
| 520192 | DB:#1090, P:#226 |
| ⋮ | ⋮ |
| 522239 | DB:#449, P:#8 |
| 522240 | DB:#610, P:#108 |
| ⋮ | ⋮ |
| 524287 | DB:#41, P:#88 |
| 524288 | DB:#345, P:#191 |
| ⋮ | ⋮ |
| 526335 | DB:#518, P:#65 |
| ⋮ | ⋮ |
| 1042432 | DB:#78, P:#136 |
| ⋮ | ⋮ |
| 1044479 | DB:#28, P:#7 |
| ⋮ | ⋮ |
| 1046528 | DB:#66, P:#49 |
| ⋮ | ⋮ |
| 1048575 | DB:#1731, P:#204 |
| ⋮ | ⋮ |

400

| Logical address | Physical address |
|---|---|
| 0 | DB:#23, P:#4 |
| 1 | DB:#3708, P:#71 |
| ⋮ | ⋮ |
| 2047 | DB:#4, P:#115 |
| 2048 | DB:#1, P:#34 |
| ⋮ | ⋮ |
| 4095 | DB:#64, P:#175 |
| ⋮ | ⋮ |
| 520192 | DB:#1090, P:#226 |
| ⋮ | ⋮ |
| 522239 | DB:#449, P:#8 |
| 522240 | DB:#610, P:#108 |
| ⋮ | ⋮ |
| 524287 | DB:#41, P:#88 |
| 524288 | DB:#345, P:#191 |
| ⋮ | ⋮ |
| 526335 | DB:#518, P:#65 |
| ⋮ | ⋮ |
| 1042432 | DB:#78, P:#136 |
| ⋮ | ⋮ |
| 1044479 | DB:#28, P:#7 |
| ⋮ | ⋮ |
| 1046528 | DB:#66, P:#49 |
| ⋮ | ⋮ |
| 1048575 | DB:#1731, P:#204 |
| ⋮ | ⋮ |

402

DB: data block numbering
P: physical page numbering

FIG. 4

DB: data block numbering
P: physical page numbering

| 134A' | | | | | |
|---|---|---|---|---|---|
| P:#0 | 0 | DB:#1 | P:#34 | ... | |
| P:#1 | 0 | DB:#610 | P:#108 | ... | |
| P:#2 | 1 | DB:#610 | P:#108 | ... | |
| ... | ... | ... | ... | ... | ... |
| P:#255 | | | | | |

1302 ⌐ (left group), 1304 ⌐ (right group)

Right half of 134A' — columns continued: 0 | DB:#64 | P:#175 (G1); 0 | DB:#2972 | P:#17 (G255); 1 | DB:#2972 | P:#17 (G255)

| 134B' | | | |
|---|---|---|---|
| P:#0 | 1 | DB:#345 | P:#191 |
| P:#1 | | ... | |
| ... | | | |
| P:#255 | | | |

Right half of 134B': 1 | DB:#518 | P:#65 (G256)

APPARATUSES FOR MANAGING AND ACCESSING FLASH MEMORY MODULE

CROSS-REFERENCE TO RELATED APPLICATIONS

This application is a Divisional of co-pending U.S. patent application Ser. No. 13/113,376, filed on May 23, 2011, which claims priority under 35 U.S.C. §119(e) to U.S. Provisional Application No. 61/347,500 filed on May 24, 2010. The entire contents of which are hereby incorporated by reference in their entireties.

BACKGROUND

The present disclosure generally relates to flash memory, and more particularly, to apparatuses for managing and accessing a flash memory module.

Flash memory has been widely applied in various applications including memory cards, digital cameras, digital video recorders, multimedia reproducing devices, mobile phones, solid-state drivers, computers, and many other electronic apparatuses. Flash memory can be implemented with single-level cells (SLC), multi-level cells (MLC), triple-level cells (TLC), and so on.

The accessing (e.g., reading and writing) speed of the flash memory is crucial in many applications. For example, in secure digital (SD) cards, the write operation of the flash memory must be completed in 250 ms. Otherwise, the flash memory would be disconnected by a host device. The accessing speed of the flash memory can be enhanced by improving the performance of the flash memory controller, for example, improving the addressing performance of the flash memory controller by increasing the capacity of the built-in volatile memory in the flash memory controller. Increasing the capacity of the built-in memory, however, takes more space in the flash memory controller and the enlarged flash memory controller may not be suitable in some applications, nor complying with the trend of device miniaturization.

SUMMARY

In view of the foregoing, it can be appreciated that a substantial need exists for apparatuses that can improve the accessing speed of flash memory.

An exemplary embodiment of a controller for managing a flash memory module is disclosed comprising: a communication interface for coupling with a host device; and a processing circuit coupled with the communication interface and configured for recording a first address group comprising a first set of M addresses corresponding to a first set of M sequential logical addresses in a first section of a first addressing block, recording a second address group comprising a second set of M addresses corresponding to a second set of M sequential logical addresses in a second section of the first addressing block, recording a third address group comprising a third set of M addresses corresponding to a third set of M sequential logical addresses in a first section of a second addressing block, and recording a fourth address group comprising a fourth set of M addresses corresponding to a fourth set of M sequential logical addresses in a second section of the second addressing block; wherein M is an integer larger than one, the second set of M logical addresses is successive to the first set of M logical addresses, the third set of M logical addresses is successive to the second set of M logical addresses, and the fourth set of M logical addresses is successive to the third set of M logical addresses.

Another exemplary embodiment of a controller for managing a flash memory module is disclosed comprising: a processing circuit configured for recording a plurality of address groups into a plurality of addressing blocks, wherein the processing circuit writes each address group into a physical page of one of the plurality of addressing blocks, and each of the plurality of address groups containing a plurality of address mapping information respectively corresponding to a plurality of sequential logical addresses; and a communication interface for coupling with the processing circuit for receiving a write command with respect to a target logical address from a host device; wherein the processing circuit writes the target logical address and associated data into a destination page of a target data block, retrieves the address mapping information for the target logical address from the plurality of address groups, updates the retrieved address mapping information based on physical location information of the destination page of the target data block, and writes a target address group containing updated address mapping information for the target logical address into a target page of a target addressing block.

An exemplary embodiment of a controller for accessing a flash memory module is disclosed comprising: a processing circuit configured for recording a first address group comprising a first set of M addresses corresponding to a first set of M sequential logical addresses in a first section of a first addressing block, recording a second address group comprising a second set of M addresses corresponding to a second set of M sequential logical addresses in a second section of the first addressing block, recording a third address group comprising a third set of M addresses corresponding to a third set of M sequential logical addresses in a first section of a second addressing block, and recording a fourth address group comprising a fourth set of M addresses corresponding to a fourth set of M sequential logical addresses in a second section of the second addressing block; and a communication interface coupled with the processing circuit for communicating with a host device; wherein M is an integer larger than one, the second set of M logical addresses is successive to the first set of M logical addresses, the third set of M logical addresses is successive to the second set of M logical addresses, and the fourth set of M logical addresses is successive to the third set of M logical addresses, and if the communication interface receives an access command with respect to a target logical address within the first, second, third, or fourth set of logical addresses from the host device, the processing circuit converts the target logical address into a corresponding target physical address based on the content record in the first, second, third, or fourth address group, and accesses a memory page of the flash memory module pointed by the target physical address.

Another exemplary embodiment of a controller for accessing a flash memory module is disclosed comprising: a communication interface for coupling with a host device; and a processing circuit coupled with the communication interface and configured for interleaving a plurality of logical addresses into a plurality of data blocks of a data writing group; wherein every time the processing circuit writes one of the plurality of logical addresses into one data block of the data writing group, the processing circuit writes a next one of the plurality of logical addresses into another data block of the data writing group; and wherein after erasing a first data block of the data writing group, the processing circuit writes data into a second data block of the data writing group without erasing the second data block in advance.

It is to be understood that both the foregoing general description and the following detailed description are exemplary and explanatory only and are not restrictive of the invention, as claimed.

BRIEF DESCRIPTION OF THE DRAWINGS

FIG. 4 and FIG. 5 are schematic address mapping of logical addresses onto physical addresses of data blocks in accordance with an exemplary embodiment.

FIG. 13 and FIG. 14 are schematic diagrams of updated address mapping information recorded in the addressing blocks in accordance with a first exemplary embodiment.

FIG. 22 and FIG. 23 are schematic diagrams of updated address mapping information recorded in the addressing blocks in accordance with a second exemplary embodiment.

DETAILED DESCRIPTION

Reference will now be made in detail to exemplary embodiments of the invention, which are illustrated in the accompanying drawings. The same reference numbers may be used throughout the drawings to refer to the same or like parts or operations.

Certain terms are used throughout the description and following claims to refer to particular components. As one skilled in the art will appreciate, vendors may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ." Also, the phrase "coupled with" is intended to compass any indirect or direct connection. Accordingly, if this document mentioned that a first device is coupled with a second device, it means that the first device may be directly connected to the second device (including through an electrical connection or other signal connections, such as wireless communications or optical communications), or indirectly connected to the second device through an indirect electrical connection or signal connection via other intermediate device or connection means.

Figure 1:
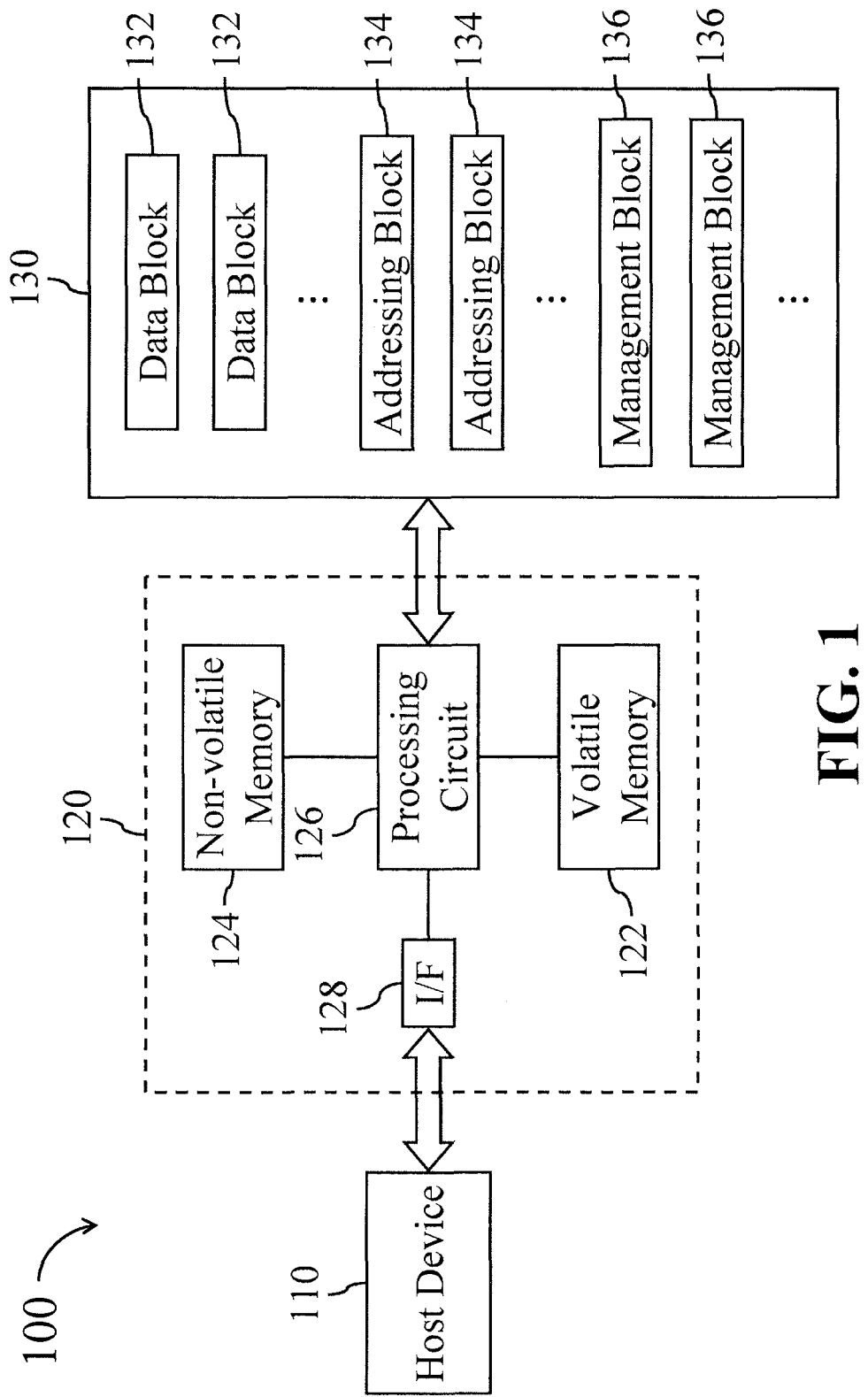
FIG. 1 is a simplified functional block diagram of a data storage system in accordance with an exemplary embodiment.

FIG. 1 shows a simplified functional block diagram of a data storage system 100 in accordance with an exemplary embodiment. The data storage system 100 comprises a host device 110, a controller 120, and a flash memory module 130. The host device 110 accesses the flash memory module 130 through the controller 120. The host device 110 may be a card reader, a digital camera, a digital video recorder, a mobile phone, a GPS device, or any other electronic device capable of using the flash memory module 130 as a storage device. The controller 120 comprises a volatile memory 122 (such as an SRAM module), a non-volatile memory 124, a processing circuit 126, and a communication interface 128. The non-volatile memory 124 is utilized for storing program codes for controlling the operations of the processing circuit 126. The processing circuit 126 buffers (i.e., temporarily stores) data to be accessed and address mapping information in the volatile memory 122 during operations. The communication interface 128 is utilized for coupling with the host device 110 so that the processing circuit 126 can communicate with the host device 110 via the communication interface 128.

In one embodiment, the flash memory module 130 is implemented with multiple MLC chips or TLC memory chips for reducing the hardware cost, and these memory chips may be divided into a plurality of data blocks 132, a plurality of addressing blocks 134, and one or more management blocks 136. The data blocks 132 are used for storing user data received from the host device 110. Addressing blocks 134 and management blocks 136 are utilized by the controller 120 for storing address mapping information, page validity information, and other related information for management purposes. In implementations, the addressing blocks 134 may reside in the same or different flash memory chips. Similarly, the management blocks 136 may reside in the same or different flash memory chips.

The controller 120 and the flash memory module 130 may be integrated together in a single memory device capable of detachably connecting with the host device 110. Alternatively, the controller 120 and the host device 110 may be integrated together in a single electronic device.

When the host device 110 needs to access the data blocks 132 of the flash memory module 130, the host device 110 would request the controller 120 to access data of a logical address by sending a command (such as a write command or a read command) to the controller 120 via the communication interface 128. The processing circuit 126 converts the logical address into a corresponding physical address within a data block 132 of the flash memory module 130 and then accesses the data in the physical address according to the command sent from the host device 110.

For example, when the host device 110 needs to write data to the flash memory module 130, the host device 110 may transmit a plurality of write commands to the controller 120, and each write command requests the controller 120 to write data into an associated logical address. That is, there are a plurality of data and associated logical addresses to be written into the flash memory module 130. To improve data writing speed, the processing circuit 126 interleaves the plurality of data and associated logical addresses into a data writing group consisted of multiple data blocks 132 of the flash memory module 130. The processing circuit 126 may select two, four, eight, or other number of data blocks 132 from different flash memory chips of the flash memory module 130 to form a data writing group and sequentially write data into pages of the data writing group. The data writing operations will be described in more detail with reference to FIG. 2 and FIG. 3.

Figure 2:
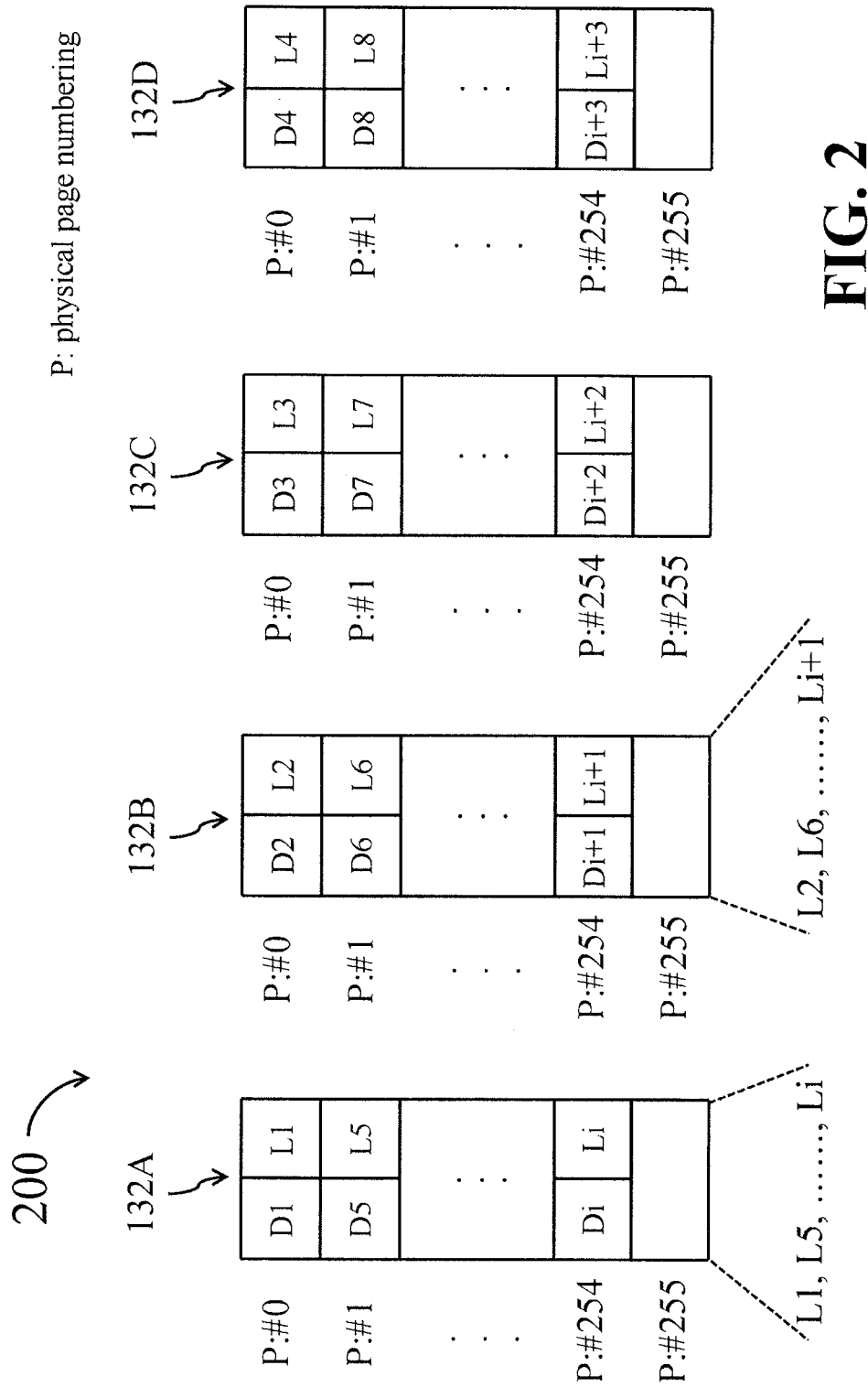
FIG. 2 is a simplified schematic diagram of a data writing group in accordance with an exemplary embodiment.
Figure 3:
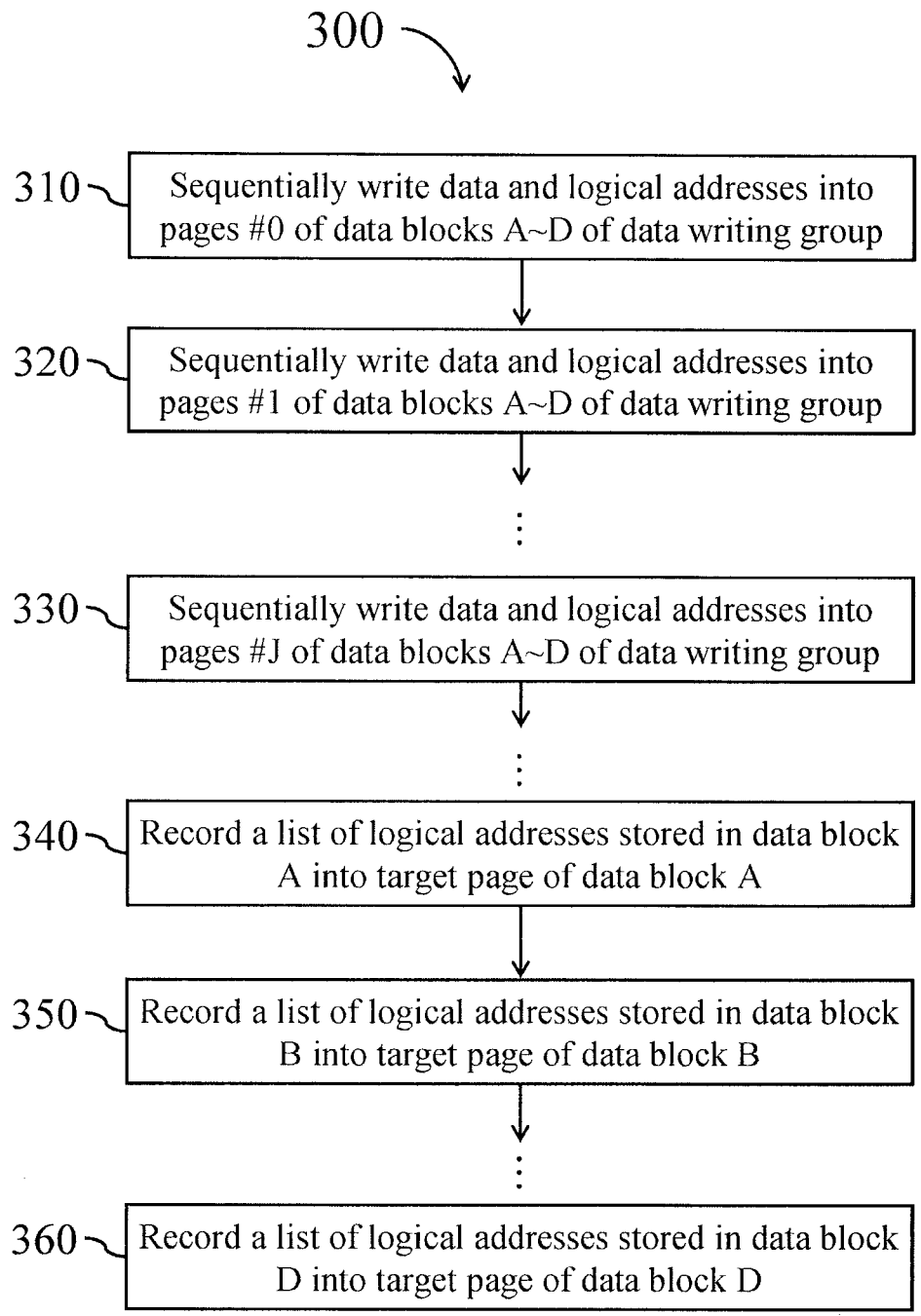
FIG. 3 is a simplified flowchart illustrating a method for writing data into a data writing group according to an exemplary embodiment.

FIG. 2 is a simplified schematic diagram of a data writing group 200 in accordance with an exemplary embodiment. FIG. 3 is a flowchart 300 illustrating a method for writing data into the data writing group 200 according to an exemplary embodiment. For the purpose of explanatory convenience in the following description, it is assumed that each data block 132 of this embodiment has 256 physical pages (numbered from 0~255), and the processing circuit 126 selects four data blocks 132A, 132B, 132C, and 132D from different flash memory chips to form the data writing group 200. Hereinafter, a physical page whose page numbering is X will be referred to as a "physical page #X" for the sake of explanatory convenience.

In operation 310, the processing circuit 126 sequentially writes data and logical addresses into physical pages #0 of the data blocks 132A~132D of the data writing group 200. For example, the processing circuit 126 may write data D1 and an associated logical address L1 received from the host device 110 into the physical page #0 of the data block 132A, and then writes data D2 and an associated logical address L2 received from the host device 110 into the physical page #0 of the data block 132B. Then, the processing circuit 126 writes data D3 and an associated logical address L3 received from the host device 110 into the physical page #0 of the data block 132C, and then write data D4 and an associated logical address L4 received from the host device 110 into the physical page #0 of the data block 132D.

Then, the processing circuit 126 performs operation 320 to sequentially write data and logical addresses into physical pages #1 of the data blocks 132A~132D of the data writing group 200. For example, the processing circuit 126 may write data D5 and an associated logical address L5 received from the host device 110 into the physical page #1 of the data block 132A, and then writes data D6 and an associated logical address L6 into the physical page #1 of the data block 132B. Then, the processing circuit 126 writes data D7 and an associated logical address L7 into the physical page #1 of the data block 132C, and then write data D8 and an associated logical address L8 into the physical page #1 of the data block 132D.

Following the data writing order described above, the processing circuit 126 sequentially writes data and associated logical addresses into the other available physical pages of the data blocks 132A~132D. Afterward, for example, the processing circuit 126 may sequentially write data and associated logical addresses into physical pages #J, such as pages #254 of the data blocks 132A~132D (operation 330).

In the above embodiment, the processing circuit 126 sequentially writes data and logical addresses into physical pages with the same page numbering, such as #1, in a writing cycle, but this is merely an example rather than a restriction for the implementations. For example, in another embodiment, the processing circuit 126 may write data and logical addresses into physical pages with different page numberings in a writing cycle.

As can be seen from the foregoing, after writing one of the logical addresses and its associated data into an available physical page of one of the data blocks 132 of the data writing group 200, the processing circuit 126 writes a next logical address to be written and its associated data into an available physical page of another data block 132 of the data writing group 200. That is, every time a logical address Ln and associated data Dn are written into a physical page of one data block 132 of the data writing group 200, the next logical address Ln+1 and associated data Dn+1 would be written into a physical page of another data block 132 of the data writing group 200. In this way, the processing circuit 126 interleaves the plurality of data and associated logical addresses to be written into a plurality of physical pages, which are respectively residing in the data blocks 132A~132D.

Since the data blocks 132A, 132B, 132C, and 132D are located in different flash memory chips, the operation of writing data and logical addresses into an available physical page of a data block 132 will not influence the operation of writing data and logical address into an available physical page of another data block 132. Thus, the latency of writing multiple data into multiple pages (e.g., physical pages #1 of different data blocks) can be greatly reduced, and thereby improving the data writing speed for the flash memory module 130.

In operations, the processing circuit 126 may dynamically select a certain number of data blocks 132 having available physical pages to form a data writing group for expediting the data writing operations. The selected data blocks 132 of the data writing group may or may not have the same number of available physical pages. Additionally, the processing circuit 126 may change the data block member of a data writing group from time to time based on the usage/ damage situations of data blocks 132 to avoid using bad data blocks and avoid overusing particular data blocks.

For addressing management purpose, the processing circuit 126 reserves at least one physical page of each of the data blocks 132 of the data writing group 200 as a target page. For example, the processing circuit 126 may reserve the last physical pages #255 of the data blocks 132A~132D as target pages. When the processing circuit 126 has finished data writing for all the other physical pages of the data block 132A, the processing circuit 126 performs operation 340 to records a list of logical addresses L1~Li, which are stored in all the other physical pages #0~#254 of the data block 132A, into the target physical page #255 of the data block 132A in an order based on the physical locations in which those logical addresses L1~Li are stored. For example, the logical addresses L1~Li may be recorded in the physical page #255 of the data block 132A in an order based on the page numberings of the physical pages #0~#254.

In the embodiment shown in FIG. 2, the physical page #255 of the data block 132A contains a logical address sequence formed by the logical addresses L1~Li stored in the other physical pages of the data block 132A, and the position of each logical address recorded in the physical page #255 represents the physical page where the logical address is stored.

Similarly, when the processing circuit 126 has finished data writing for the other physical pages of the data block 132B, the processing circuit 126 performs operation 350 to records a list of logical addresses L2~Li+1, stored in all the other physical pages #0~#254 of the data block 132B, into the physical page #255 of the data block 132B in an order based on the physical locations in which the logical addresses L2~Li+1 are stored. As shown in FIG. 2, the physical page #255 of the data block 132B contains a logical address sequence formed by the logical addresses L2~Li+1 stored in the other physical pages of the data block 132B, and the position of each logical address recorded in the physical page #255 represents the physical page where the logical address in stored.

In this embodiment, every time the processing circuit 126 finishes data writing for the other physical pages of a particular data block 132, the processing circuit 126 records a list of logical addresses, stored in all the other physical pages of the particular data block 132, into the reserved target page of the particular data block 132 in an order based on the physical locations in which those logical addresses are stored. For example, when the processing circuit 126 afterward finishes data writing for the other physical pages of the data block 132D, the processing circuit 126 would perform operation 360 to records the logical addresses stored in all the other physical pages of the data block 132D into the target page of the data block 132D in the same manner described above.

Accordingly, with the logical address sequence stored in the target page of a data block 132, the processing circuit 126 is able to easily and rapidly obtain all the logical addresses stored in the data block 132 and the physical pages to which those logical addresses are respectively mapped. For example, the second place of the logical address sequence stored in the physical page #255 of the data block 132A is recorded with the logical address L5. Thus, the processing circuit 126 can learn from the position of the logical address L5 in the logical address sequence that the logical address L5 and its associated data D5 is stored in the second physical page of the data block 132A, i.e., the physical page #1 in this case. In other words, the logical address sequence stored in each data bock 132 may be regarded as a preliminary address mapping information for those logical addresses stored in that data block 132.

Afterward, if the host device 110 sends a write command requesting the controller 120 to write a new data D5' to the logical address L5, which is already stored in the physical page #1 of the data block 132A, the processing circuit 126 may write the new data D5' and the associated logical address L5 into an available physical page of one of the data blocks 132A~132D of the data writing group 200. Alternatively, the processing circuit 126 may write the new data D5' and the associated logical address L5 into another data block 132 outside the data writing group 200.

As described previously, when the host device 110 needs to access the data blocks 132 of the flash memory module 130, the processing circuit 126 has to translate the logical address sent from the host device 110 into a corresponding physical address of the data blocks 132, and then accesses a physical page to which the physical address points. Unfortunately, the address mapping relationship between logical address and physical address of the data blocks 132 changes in the subsequent data writing/deletion operations.

Figure 5:
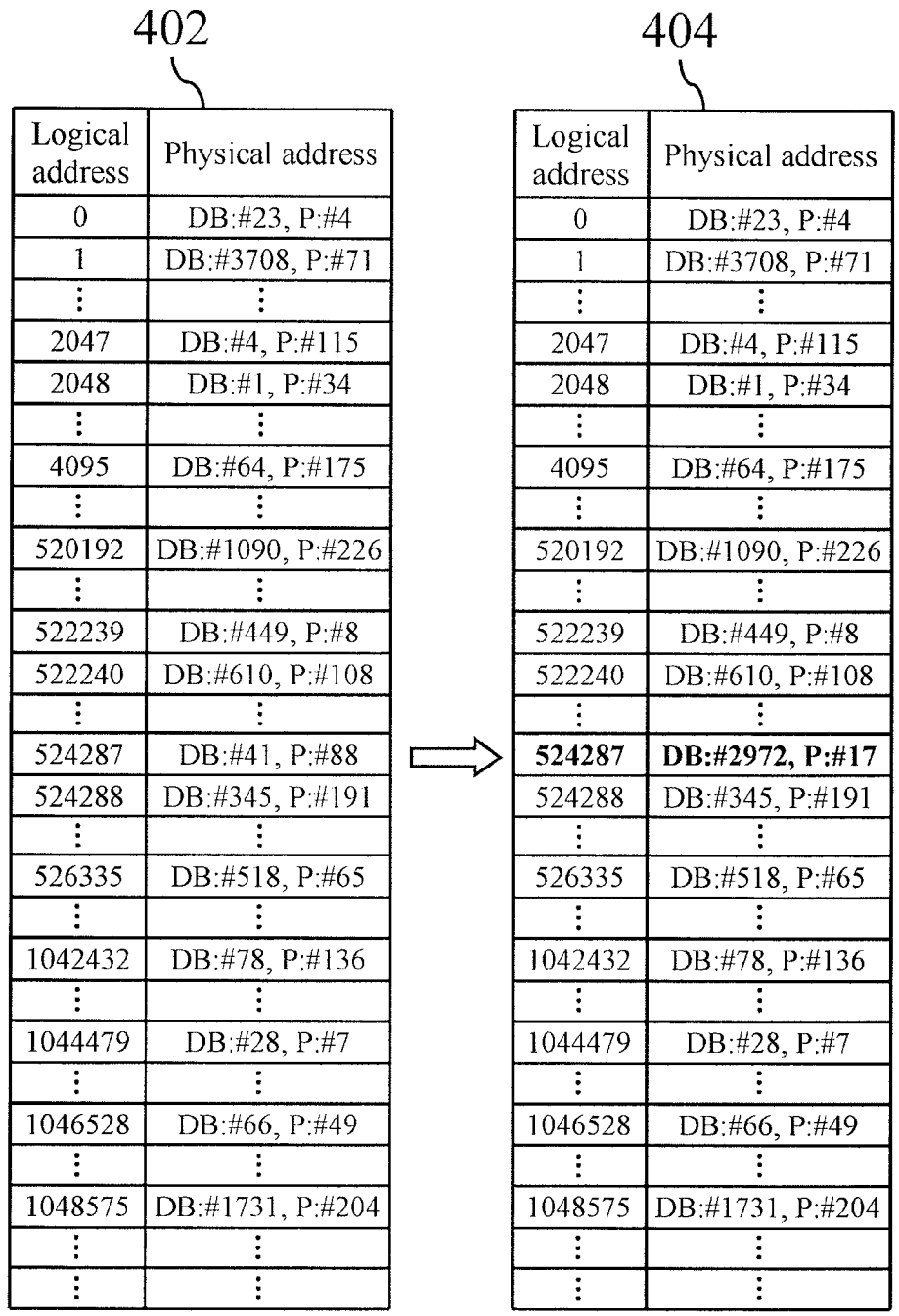

FIG. 4 and FIG. 5 illustrate schematic address mapping of logical addresses onto physical addresses of the data blocks 132 in accordance with an exemplary embodiment. As illustrated in an address mapping 400, each logical address is mapped to only one active or valid physical page of a data block 132, in which the logical address is latest stored. For example, the logical address 1 is mapping to a physical page #71 located in a data block 132 whose block numbering is 3708, and another logical address 4095 is mapping to a physical page #37 of a data block 132 whose block numbering is 2351. Hereinafter, a data block 132 whose block numbering is Z may be referred to as a "data block #Z" for the sake of explanatory convenience. As illustrated in the address mapping 400, the addresses of valid physical pages corresponding to a plurality of sequential logical addresses, such as logical addresses 0~524288, are often not arranged sequentially.

When updating data for a certain logical address, the processing circuit 126 has to write new data and the logical address into an available physical page of an available data block 132. This would change the address mapping between logical addresses and physical addresses and inevitably render the original address mapping for the logical address obsolete. Therefore, after writing a logical address and associated data into a new physical page, the address mapping for the logical address should be updated to reflect the current situation.

For example, if the processing circuit 126 afterward writes new data with respect to the logical address 4095 into an available physical page #175 of a data block #64, the address mapping between the logical address 4095 and the original physical address (i.e., physical page #37 of the data block #2351 in the address mapping 400) would become obsolete. The new address mapping of logical addresses onto physical addresses of data blocks 132 is illustrated in an address mapping 402 of FIG. 4. Afterward, if the processing circuit 126 writes updated data for the logical address 524287 into an available physical page #17 of a data block #2972, then the new address mapping of logical addresses onto physical addresses of the data blocks 132 would become an address mapping 404 as shown in FIG. 5.

The performance of logical address to physical address conversion (a.k.a. address translation or address resolution) conducted by the controller 120 greatly influences the accessing speed of the flash memory module 130. Therefore, the address mapping of logical addresses onto physical addresses of the data blocks 132 should be kept updating by the controller 120 for accomplishing the address translation operations. On the other hand, considerable amount of data blocks are typically employed in the flash memory module 130 nowadays for satisfying large memory capacity demand. The information amount of address mapping of logical addresses onto physical addresses of the data blocks 132 is proportional to the amount of data blocks employed in the flash memory module 130. If all the address mapping information for all logical addresses is buffered in the controller 120 during the accessing operations for the flash memory module 130, the controller 120 should be provided with a memory with huge memory capacity.

Memory with huge memory capacity not only occupies greater volume inside the controller 120 but also increases the overall hardware cost of the controller 120. However, the controller 120 may be not allowed to have a memory with huge memory capacity for many applications in consideration of cost and space volume restrictions, especially in the mini-sized memory card environments. Thus, the processing circuit 126 of this embodiment maintains the address mapping information for logical addresses in such a way that the volatile memory 122 needs not to buffer all address mapping information for the entire flash memory module 130 during operations so as to effectively reduce hardware cost and required space volume inside the controller 120. The operations of maintaining address mapping information for logical addresses conducted by the processing circuit 126 will be described in further detail with reference to FIG. 6 through FIG. 14.

Figure 6:
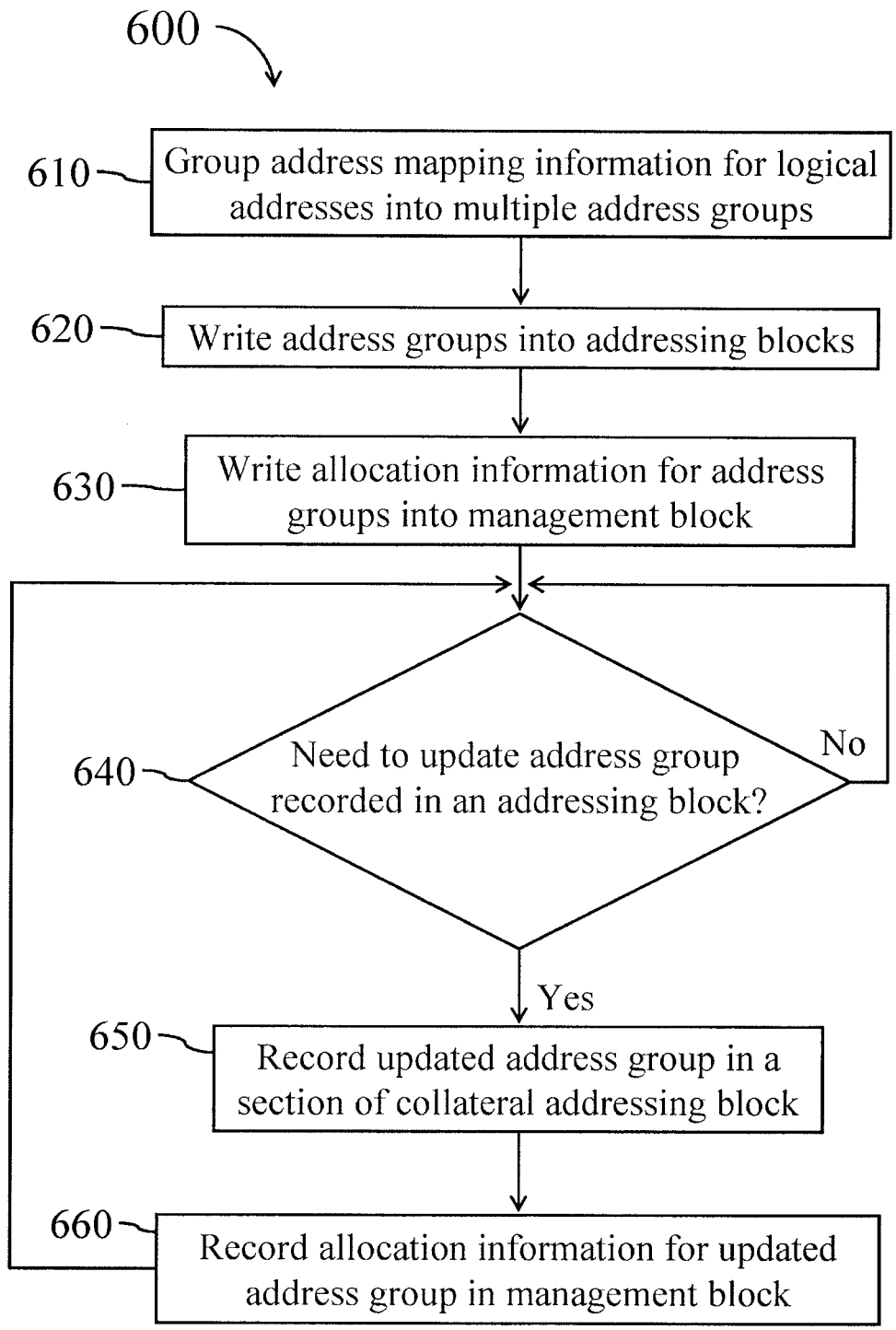
FIG. 6 is a simplified flowchart illustrating a method for maintaining address mapping information for logical addresses in accordance with a first exemplary embodiment.
Figure 7:
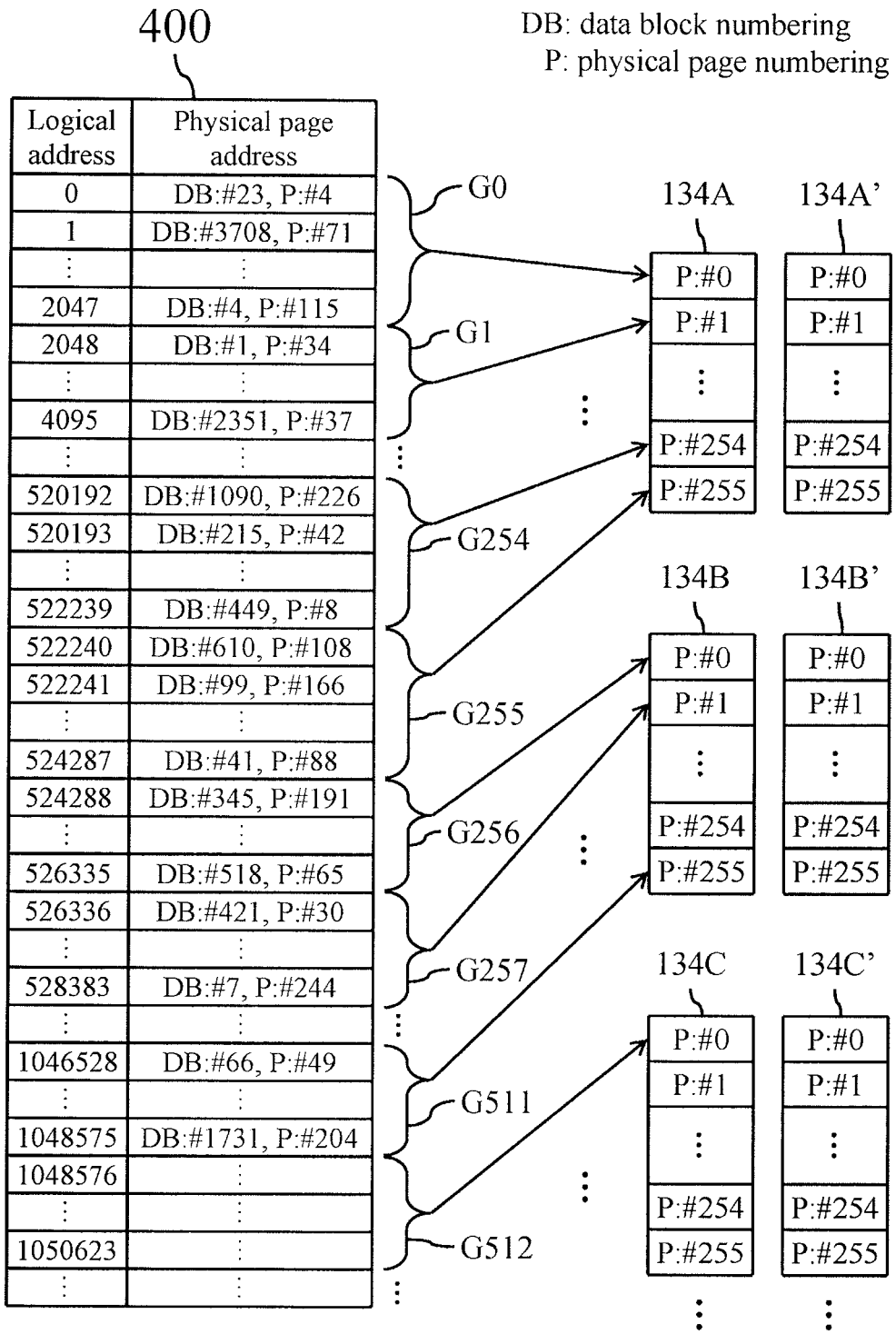
FIG. 7 is a schematic diagram of writing address mapping information for logical addresses into addressing blocks in accordance with a first exemplary embodiment.

FIG. 6 shows a simplified flowchart 600 illustrating a method for maintaining address mapping information for logical addresses in accordance with a first exemplary embodiment. FIG. 7 shows a schematic diagram of writing address mapping information for the logical addresses into the addressing blocks 134 in accordance with a first exemplary embodiment.

In operation 610, the processing circuit 126 groups address mapping information for logical addresses that can be supported by the flash memory module 130 into multiple address groups. The processing circuit 126 may group the address mapping information for a predetermined number of sequential logical addresses as an address group. For example, in the embodiment shown of FIG. 7, the address mapping information for each logical address is a physical address represented by the combination of a data block location information (e.g., data block numbering) and a physical page location information (e.g., page numbering), and the processing circuit 126 groups 2048 address mapping information for every 2048 sequential logical addresses as an address group. That is, each address group contains 2048 physical addresses mapping to 2048 sequential logical addresses. As shown, the processing circuit 126 groups the first set of 2048 physical addresses mapping to sequential logical addresses 0~2047 as an address group G0, groups the second set of 2048 physical addresses mapping to sequential logical addresses 2048~4095 as an address group G1, and so forth.

As a result, the 2048 logical addresses with respect to a particular address group are successive to the 2048 logical addresses with respect to an adjacent address group. For example, the 2048 logical addresses with respect to the address group G2 are successive to the 2048 logical addresses with respect to the address group G1, the 2048 logical addresses with respect to the address group G255 are successive to the 2048 logical addresses with respect to the address group G254, the 2048 logical addresses with respect to the address group G256 are successive to the 2048 logical addresses with respect to the address group G255, and the 2048 logical addresses with respect to the address group G257 are successive to the 2048 logical addresses with respect to the address group G256.

As shown in FIG. 7, the content of the address group G0 are 2048 physical addresses respectively mapping to logical addresses 0~2047, the content of the address group G1 are 2048 physical addresses respectively mapping to logical addresses 2048~4095, the content of an address group G255 are 2048 physical addresses respectively mapping to logical addresses 522240~524287, the content of an address group G256 are 2048 physical addresses respectively mapping to sequential logical addresses 524288~526335, the content of an address group G511 are 2048 physical addresses respectively mapping to sequential logical addresses 1046528~1048575, and so forth.

In operation 620, the processing circuit 126 writes the content of the address groups into the addressing blocks 134. For the purpose of explanatory convenience in the following description, it is assumed that each addressing block 134 has 256 physical pages denoted by #0~#255. In this embodiment, the processing circuit 126 divides the addressing blocks 134 into primary addressing blocks denoted by 134$x$ ($x$ is A, B, C, . . . ), and collateral addressing blocks denoted by 134$x'$ ($x'$ is A', B', C', . . . ) as shown in FIG. 7.

Each primary addressing block 134$x$ is paired with an associated collateral addressing block 134$x'$ to form an addressing block pairing. For example, in the embodiment shown in FIG. 7, an addressing block 134A and an associated collateral addressing block 134A' are paired as a first addressing block pair, an addressing block 134B and an associated collateral addressing block 134B' are paired as a second addressing block pair, an addressing block 134C and an associated collateral addressing block 134C' are paired as a third addressing block pair, and so forth. The categorization of primary addressing blocks and collateral addressing blocks described above is merely for explanatory purpose and the processing circuit 126 may change the categorization of an addressing block 134 in later stage.

The processing circuit 126 in the operation 620 may record the content of each of the address groups G0~G255 in a section of the primary addressing block 134A, records the content of each of the address groups G256~G511 in a section of another primary addressing block 134B, records the content of each of the address groups G512~G767 in a section of yet another primary addressing block 134C, and so forth.

Figure 8:
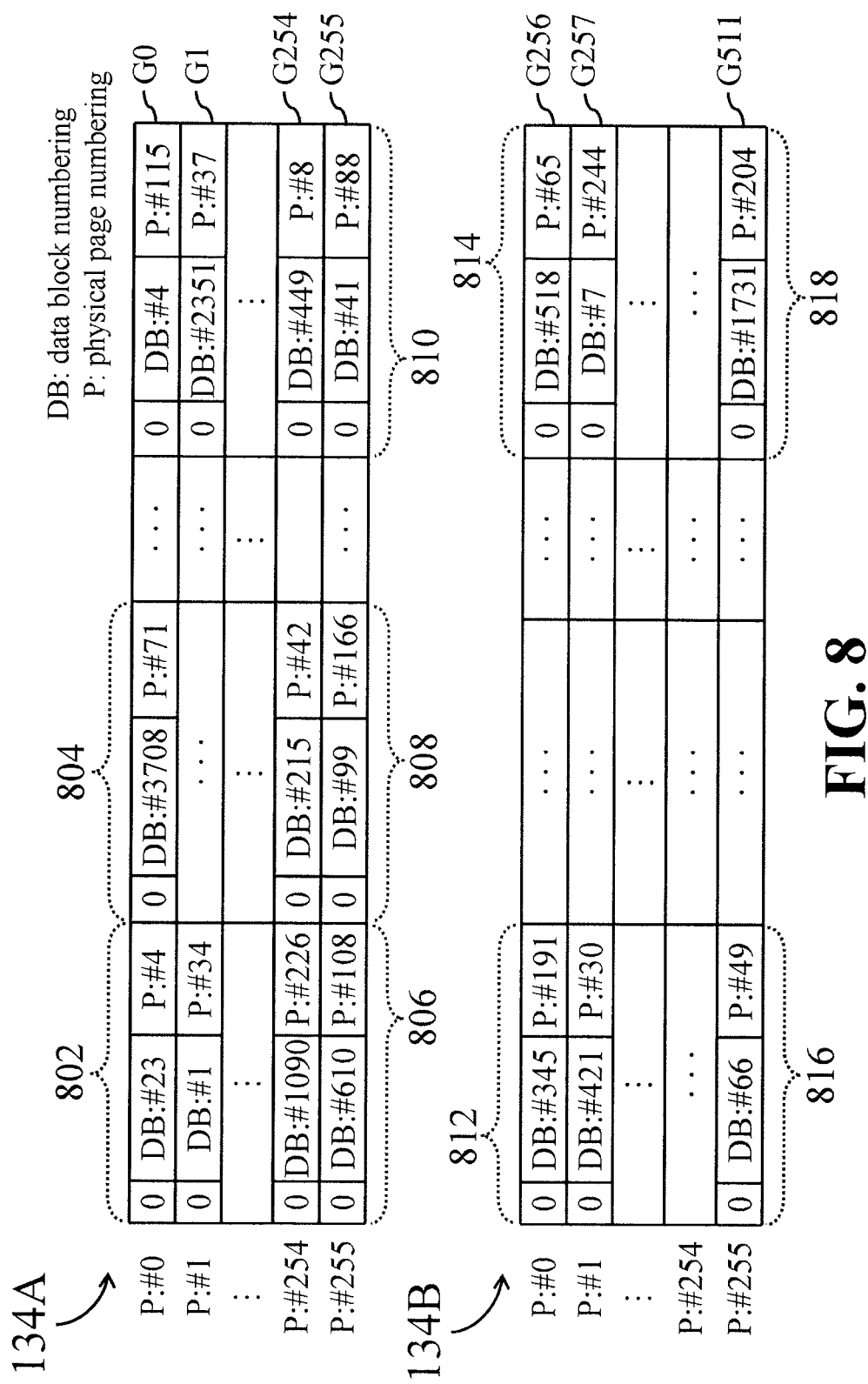
FIG. 8 is a schematic diagram of address mapping information recorded in addressing blocks in accordance with a first exemplary embodiment.

In the embodiment of FIG. 7, the processing circuit 126 records the 2048 address mapping information of each of the address groups G0~G255 in a physical page of the addressing block 134A in an order based on the address order of the corresponding 2048 logical addresses. As illustrated in FIG. 8, for example, the processing circuit 126 writes the first address mapping information of the address group G0 (i.e., data block #23 and physical page #4 in this case) and a data validity mark of the first address mapping information into the first position of the physical page #0 of the addressing block 134A as an information unit 802, writes the second address mapping information of the address group G0 (i.e., data block #3708 and physical page #71 in this case) and a data validity mark of the second address mapping information into the second position of the physical page #0 of the addressing block 134A as an information unit 804, and so forth. Thus, the 2048th address mapping information of the address group G0 and a corresponding data validity mark would be recorded in the 2048th position of the physical page #0 of the addressing block 134A as an information unit. In implementations, the address mapping information for each logical address may be recorded with any suitable size, e.g., a longword.

Similarly, the processing circuit 126 writes the 2048 address mapping information contained in the address group G254 and corresponding data validity marks into the physical page #254 of the addressing block 134A. Then, the processing circuit 126 writes the first address mapping information of the address group G255 (i.e., data block #610 and physical page #108 in this case) and a corresponding data validity mark into the first position of the physical page #255 of the addressing block 134A as an information unit 806, writes the second address mapping information of the address group G255 (i.e., data block #99 and physical page #166 in this case) and a corresponding data validity mark into the second position of the physical page #255 of the addressing block 134A as an information unit 808, and so forth. Accordingly, the 2048th address mapping information of the address group G255 (i.e., data block #41 and physical page #88 in this case) and a corresponding data validity mark would be recorded in the 2048th position of the physical page #255 of the addressing block 134A as an information unit 810.

In addition, the processing circuit 126 also writes the 2048 address mapping information contained in the address group G256 and corresponding data validity marks into the physical page #0 of the addressing block 134B as 2048 information units, such as information units 812 and 814 shown in FIG. 8.

Similarly, the processing circuit 126 writes the first address mapping information of the address group #511 (i.e., data block #66 and physical page #49 in this case) and a corresponding data validity mark into the first position of the physical page #255 of the addressing block 134B as an information unit 816, and writes the 2048th address mapping information of the address group #511 (i.e., data block #1731 and physical page #204 in this case) and a corresponding data validity mark into the 2048th position of the physical page #255 of the addressing block 134B as an information unit 818.

The processing circuit 126 continues writing the content of the other address groups into the other addressing blocks 134 as described above until all the address groups are completely recorded in the addressing blocks 134. In the embodiment of FIG. 8, the processing circuit 126 sets the data validity mark of each address mapping information of the address groups to a first predetermined value, 0, representing that the data stored in the physical page, to which the address mapping information points, is valid. The function of the data validity mark will be further described later. As a result, an initial address mapping of physical addresses onto logical addresses is established and stored in the addressing blocks 134.

As can be seen from the foregoing, in an address group the address mapping information for sequential logical addresses are sorted by the sequence of the logical addresses. In addition, the position, in which an address mapping information for a particular logical address is positioned, is corresponding to the sequence of the particular logical address among the sequential logical addresses mapping to the address group. For example, in an address group mapping to 2048 sequential logical addresses, the address mapping information for the $N^{th}$ logical address among the 2048 logical addresses is positioned in the $N^{th}$ position of the address group. Therefore, there is no need to records the logical addresses in the address group.

In this embodiment, if a particular address group is originally stored in the addressing block 134x, then the updated versions of the particular address group would be recorded in the corresponding collateral addressing block 134x'. In other words, each pair of addressing block 134x and associated collateral addressing block 134x' can be utilized to manage 256 address groups, and each address group contains 2048 physical addresses mapping to 2048 sequential logical addresses. Accordingly, each pair of addressing block 134x and associated collateral addressing block 134x' is able to manage up to 524,288 (=256*2048) physical addresses of the data blocks 132. If each physical address points to a physical page whose page size is 8 KB, then the controller 120 is able to utilize each pair of addressing block 134x and associated collateral addressing block 134x' to manage address mapping for a memory in size of 4,194,304 KB, which translates to 4 GB. With more addressing blocks 134, the controller 120 is able to manage a much larger flash memory.

Since the address groups are respectively recorded in multiple addressing blocks 134, the processing circuit 126 also maintains the allocation information for all address groups so that it can locate a particular address group when needed.

Figure 9:
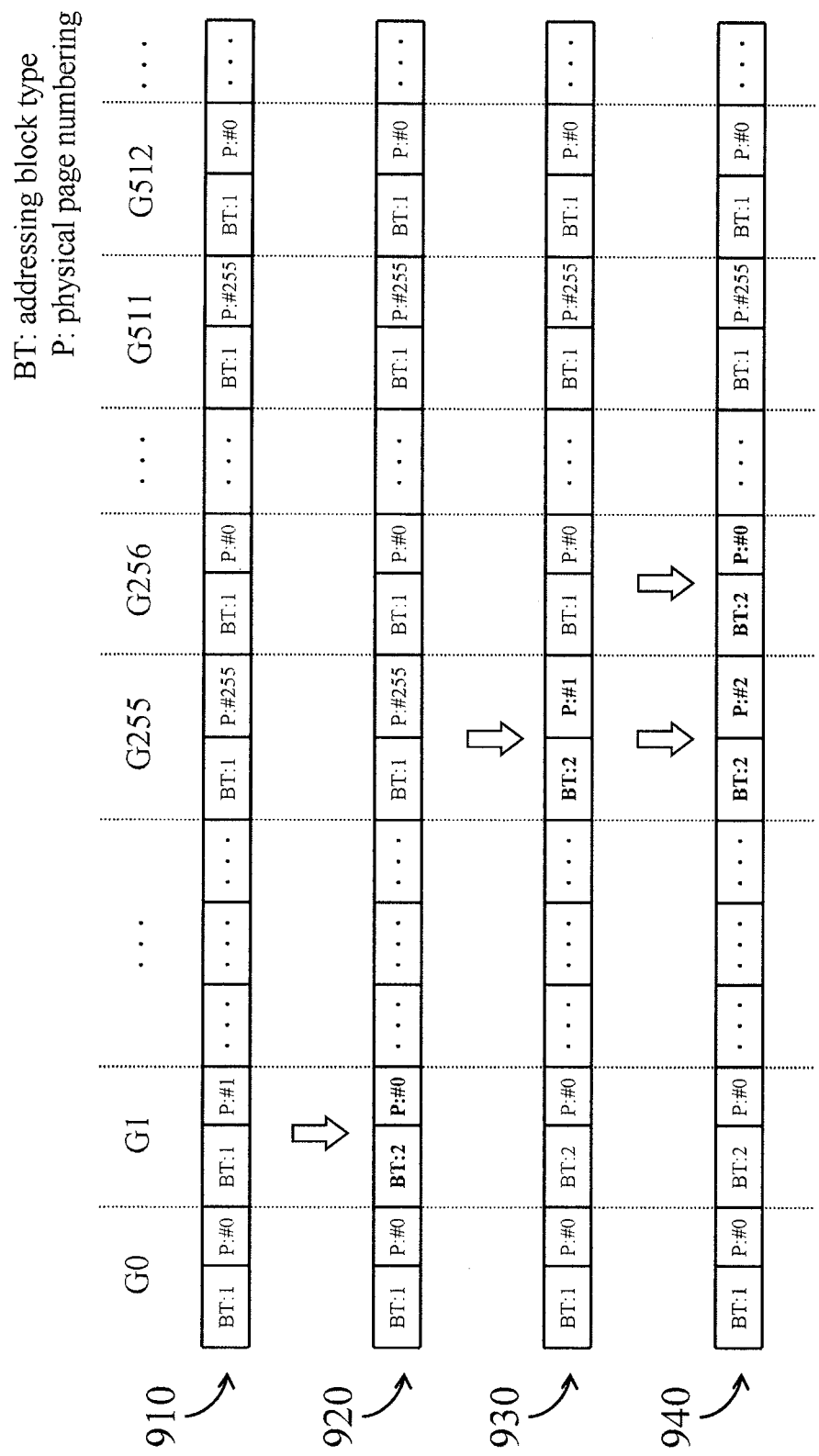
FIG. 9 is a schematic diagram of address group allocation tables for storing address group allocation information according to a first exemplary embodiment.

In operation 630, the processing circuit 126 writes allocation information for address groups into a management block 136, such as a management block 136A (not shown). The processing circuit 126 may write initial allocation information for all address groups into the management block 136A in an order based on the numberings of address groups to form an address group allocation table 910 as illustrated in FIG. 9. In the embodiment of FIG. 9, the allocation information for each of the address groups is a physical address represented by the combination of an addressing block type information and page location information (e.g., page numbering). As shown, the processing circuit 126 writes the allocation information for the first address group G0 into the first position of the address group allocation table 910, writes the address allocation information for the second address group G1 into the second position of the address group allocation table 910, writes the address allocation information for the third address group G2 into the third position of the address group allocation table 910, and so forth. Thus, the allocation information for the $512^{th}$ address group G511 would be recorded in the $512^{th}$ position of the address group allocation table 910. In implementations, the allocation information for each address group may be recorded with any suitable size, e.g., a word.

In other words, the processing circuit 126 sorts the allocation information for address groups in the address group allocation table 910 by the sequence of the group numberings of the address groups. As a result, the position, in which the allocation information for a particular address group is positioned, corresponds to the group numbering of the particular address group. Therefore, there is no need to records the group numberings of respective address groups in the address group allocation table 910.

Since the content of valid current version of the particular address group may be recorded in a primary addressing block 134x or an associated collateral addressing block 134x', the processing circuit 126 of this embodiment adds addressing block type information in the allocation information corresponding to respective address groups. In this embodiment, addressing block type 1 means that the valid current version of corresponding address group is recorded in a primary addressing block 134x, and addressing block type 2 means that the valid current version of corresponding address group is recorded in the collateral addressing block 134x' paired with the addressing block 134x.

Since the address groups containing address mapping information for the logical addresses are stored in the addressing blocks 134, and the allocation information for address groups are stored in the management block 136A, the address mapping information for the flash memory module 130 will not disappear after powered off, such as disconnected with the host device 110. Accordingly, the processing circuit 126 of the controller 120 needs not to recollect all address mapping information for the logical addresses and allocation information for address groups in the initialization procedure next time when the flash memory module 130 is powered on or connected to the host device 110. As a result, the time required for initializing the flash memory module 130 can be effectively reduced.

Figure 10:
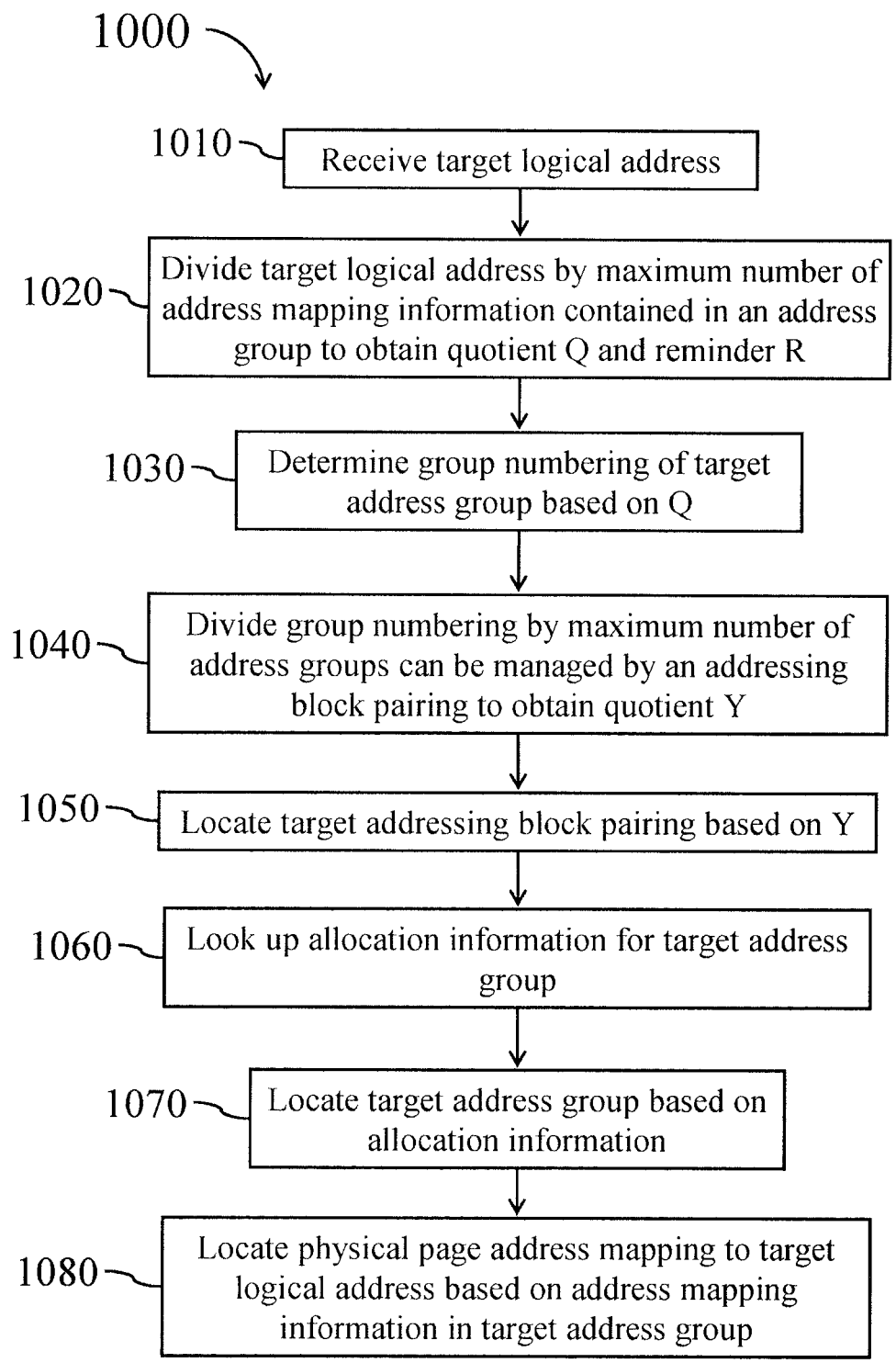
FIG. 10 is a simplified flowchart illustrating a method for translating a logical address into a corresponding physical address in accordance with a first exemplary embodiment.

Before describing operations 640 through 660 of the flowchart 600, the logical address to physical address conversion conducted by the processing circuit 126 will be explained first. When the communication interface 128 receives an access command with respect to a particular logical address from the host device 110, the processing circuit 126 translates the logical address into a corresponding physical address with reference to the address group allocation information stored in the management block 136A and the address mapping information stored in the addressing blocks 134. FIG. 10 is a simplified flowchart 1000 illustrating a method for translating a logical address into a corresponding physical address in accordance with a first exemplary embodiment.

In operation 1010, the communication interface 128 receives a target logical address associated with an access command from the host device 110. For the purpose of explanatory convenience in the following description, it is assumed that the target logical address is the logical address 522241.

In operation 1020, the processing circuit 126 divides the target logical address by the maximum number of address mapping information contained in an address group to obtain a quotient Q and a reminder R. In this embodiment, the maximum number of address mapping information contained in an address group is 2048. Accordingly, the processing circuit 126 divides 522241 by 2048 and obtains a quotient 255 and a reminder 1.

In operation 1030, the processing circuit 126 determines the group numbering of a target address group containing the address mapping information for the target logical address based on the quotient Q. Since the quotient Q obtained in the operation 1020 is 255, the processing circuit 126 determines that the target address group containing the address mapping information for the target logical address 522241 is the 256th address group G255, whose group numbering is 255 in this case.

In operation 1040, the processing circuit 126 divides the group numbering by the maximum number of address groups can be managed by an addressing block pairing to obtain a quotient Y. In this embodiment, the maximum number of address groups can be managed by an addressing block pairing is 256. Therefore, the processing circuit 126 divides the group numbering 255 by 256 to obtain a quotient 0.

In operation 1050, the processing circuit 126 locates a target addressing block pairing based on the quotient Y. Since the quotient Y obtained in the operation 1040 is 0, the processing circuit 126 determines that the target address group G255 is stored in the first addressing block pairing, which is consisted of the primary addressing block 134A and the collateral addressing block 134A' in this case.

In operation 1060, the processing circuit 126 looks up allocation information for the target address group. Since the target address group G255 is the 256th address group, the processing circuit 126 determines that the allocation information for the target address group G255 is stored in the 256th position of the latest address group allocation table stored in the management block 136A. In this case, the latest address group allocation table stored in the management block 136A is the address group allocation table 910, and the allocation information in the 256th position of the address group allocation table 910 is recorded with addressing block type 1 and physical page #255.

In operation 1070, the processing circuit 126 locates the target address group based on the allocation information. The processing circuit 126 could determine which physical page of the addressing block is utilized for recording the latest content of the target address group based on the addressing block type and physical page numbering contained in the allocation information for the target address group. Since the allocation information for the target address group G255 is recorded with addressing block type 1 and physical page #255, the processing circuit 126 determines that the content of the address group G255 is recorded in the physical page #255 of the primary addressing block 134A.

In operation 1080, the processing circuit 126 locates a physical page address mapping to the target logical address based on the address mapping information in the target address group. Since the reminder R obtained in the operation 1020 is 1, the processing circuit 126 determines that the address mapping information for the target logical address 522241 is stored in the second position of the target address group G255. As shown in FIG. 8, the address mapping information in the second position of the target address group G255 is recorded with data block #99 and physical page #166. Accordingly, the processing circuit 126 would translate the target logical address 522241 into the physical page #99 of the data block #166.

During operations, the processing circuit 126 does not buffer all valid address mapping information recorded in the addressing blocks 134 in the volatile memory 122. Instead, the processing circuit 126 may buffer only partial address mapping information of different address groups in the volatile memory 122 and perform the address translation operations illustrated in FIG. 10 to access the flash memory module 130 based on the address mapping information buffered in the volatile memory 122.

In one embodiment, for example, the processing circuit 126 divides each address group into multiple mapping information segments and buffers only some mapping information segments, respectively selected from different address groups, in the volatile memory 122. When the host device 110 requests to access a particular logical address, if a particular mapping information segment currently buffered in the volatile memory 122 contains the address mapping information for the particular logical address, the processing circuit 126 would convert the particular logical address into corresponding physical page address based on the address mapping information within the particular mapping information segment buffered in the volatile memory 122 instead of retrieving the address mapping information from the addressing blocks 134. On the other hand, if none of the mapping information segments currently buffered in the volatile memory 122 contains the address mapping information for the particular logical address, the processing circuit 126 would retrieve a valid address mapping information for the particular logical address from the addressing blocks 134 and perform the address translation operation based on valid address mapping information. In addition, the processing circuit 126 may utilize any suitable mechanism to update the address mapping information in the volatile memory 122. For example, the processing circuit 126 may discard a mapping information segment with the least utilization frequency from the volatile memory 122 and buffer a target mapping information segment containing the valid address mapping information for the particular logical address in the volatile memory 122. Since the processing circuit 126 only needs to buffer a very small portion of all valid physical addresses recorded in the addressing blocks 134 in the volatile memory 122 for supporting the address translation operations, the required memory capacity for the volatile memory 122 can be significantly reduced.

The executing order of the operations in the flowchart 1000 described above is merely an example rather than a restriction of the practical implementations. For example, the operations 1050 and 1060 can be swapped. In another embodiment, the operation 1060 can be moved to between the operations 1030 and 1040.

Please refer back to FIG. 6. As described previously, when data with respect to a certain logical address is updated or erased, the address mapping between logical addresses and physical addresses changes, thereby rendering the original address mapping for the logical address obsolete or invalid. Therefore, the processing circuit 126 in the operation 640 determines which address group recorded in the primary addressing blocks 134 needs to be updated when data updating and erasing operation occurs. When the processing circuit 126 finished a data updating or data erasing (or data deletion) operation with respect to a particular logical address, the processing circuit 126 determines that the corresponding address group should be updated in the operation 640 and then proceed to the operation 650.

In the operation 650, the processing circuit 126 updates the specific address group containing the obsolete address mapping information for the particular logical address and records the updated address group in a section of a collateral addressing block 134x' that is paired with a primary addressing block 134x in which the original address group was stored. For example, if an address group is originally recorded in a primary addressing block 134x, then the processing circuit 126 would records updated address group in a collateral addressing block 134x' paired with the primary addressing block 134x in the operation 650. The operation 650 will be described with reference to FIG. 11 through FIG. 14.

Figure 11:
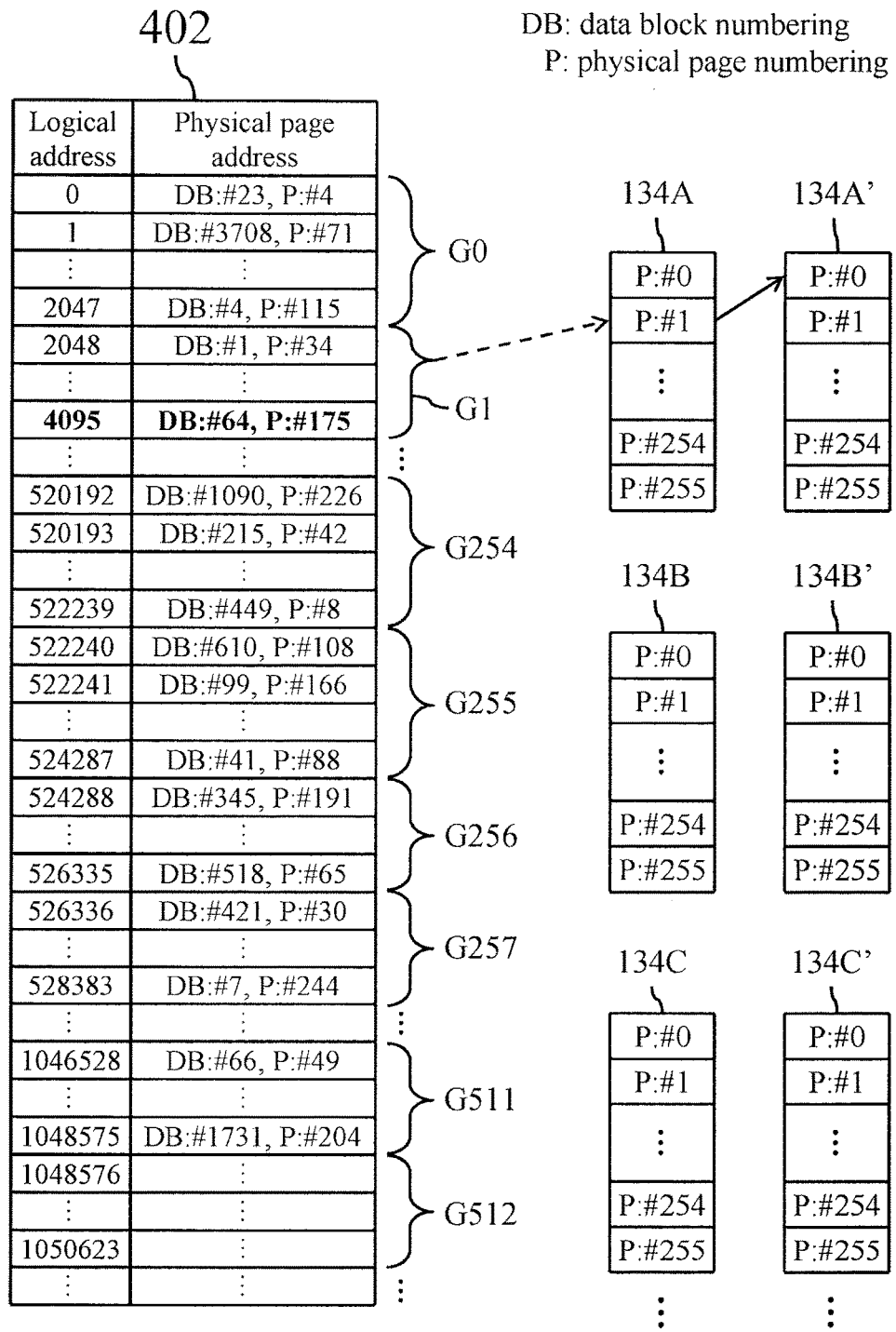
FIG. 11 and FIG. 12 are schematic diagrams of updating address mapping information for logical addresses in accordance with a first exemplary embodiment.
Figure 12:
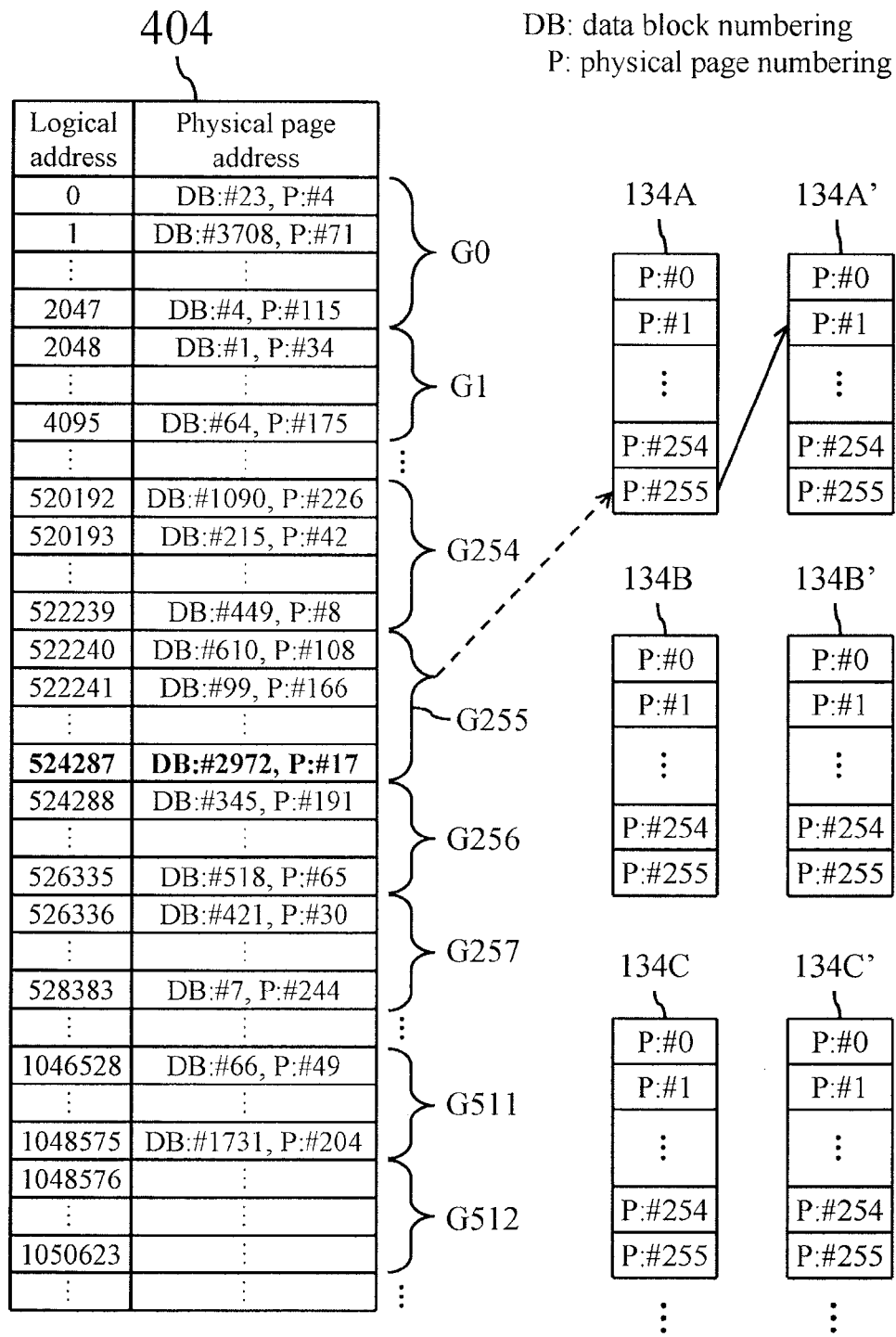
Figure 13:
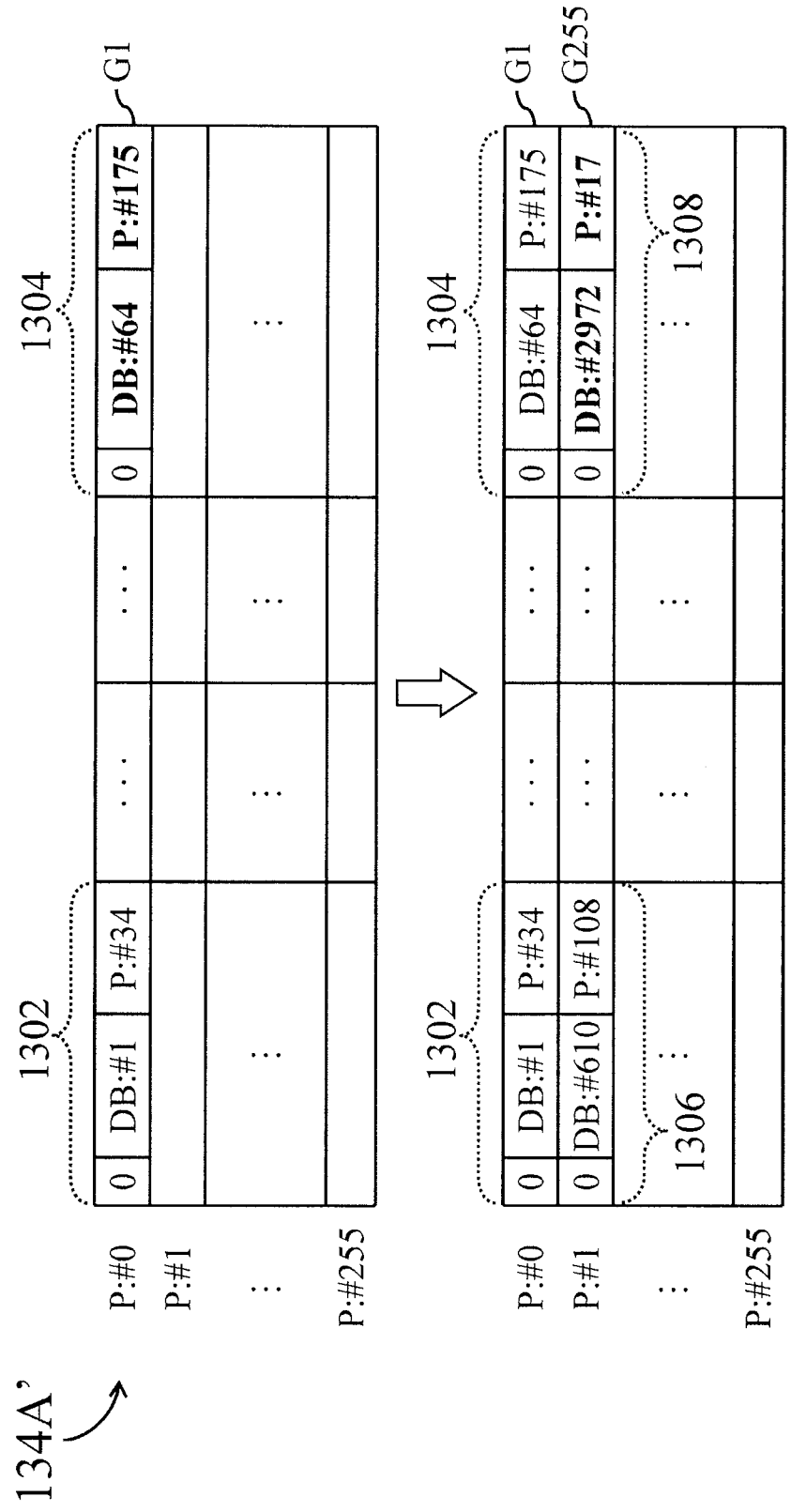

FIG. 11 and FIG. 12 are schematic diagrams of updating address mapping information for logical addresses in accordance with a first exemplary embodiment. As shown in FIG. 11, after writing new data with respect to the logical address 4095 into the physical page #175 of the data block #64, the physical address previously mapping to the logical address 4095 (i.e., the physical page #37 of the data block #2351) becomes invalid, and the current valid physical address mapping to the logical address 4095 is the physical page #175 of the data block #64. As can be seen from the address mapping 402 of FIG. 11 that the data updating operation changes the content of the address group G1.

Thus, the processing circuit 126 in the operation 650 updates the content of the address group G1 and records the updated address group G1 into an available physical page of the collateral addressing block 134A' paired with the addressing block 134A. For example, in the embodiment of FIG. 11, the processing circuit 126 may read the original content of the address group G1 from the page #1 of the addressing block 134A, and change the address mapping information for the logical address 4095 from the original physical address (i.e., the physical page #37 of the data block #2351 in this case) to a new physical address (i.e., the physical page #175 of the data block #64 in this case).

Then, the processing circuit 126 writes the content of the updated address group G1 into the physical page #0 of the addressing block 134A'. In the embodiment shown in FIG. 13, the processing circuit 126 writes the first address mapping information of the updated address group G1 (i.e., data block #1 and physical page #34 in this case) and a corresponding data validity mark into the first position of the physical page #0 of the addressing block 134A' as an information unit 1302, then writes the second address mapping information of the updated address group G1 and a corresponding data validity mark into the second position of the physical page #0 of the addressing block 134A' as another information unit, and so forth. Thus, the 2048$^{th}$ address mapping information of the updated address group G1 (i.e., data block #64 and physical page #175 in this case) and a corresponding data validity mark would be recorded in the 2048$^{th}$ position of the physical page #0 of the addressing block 134A' as an information unit 1304.

The operation of updating the content of the address group G1 into the physical page #0 of the addressing block 134A' renders the allocation information for the address group G1 recorded in the initial address group allocation table 910 obsolete. Thus, the processing circuit 126 performs the operation 660 to records the new allocation information for the updated address group G1 in the management block 136A. For example, the processing circuit 126 may read the original content of the address group allocation table 910 from the management block 136A, and change the allocation information for the address group G1 from the original one (i.e., addressing block type 1 and physical page #1 in this case) to the new setting (i.e., addressing block type 2 and physical page #0 in this case). Then, the processing circuit 126 writes the new allocation information for the address group G1 and original allocation information for other address groups into the management block 136A to form an updated address group allocation table 920 as illustrated in FIG. 9.

Afterward, if the processing circuit 126 writes updated data for the logical address 524287 into the physical page #17 of the data block #2972 based on a request from the host device 110, the new address mapping of logical addresses onto physical addresses of the flash memory module 130 would become the address mapping 404 as shown in FIG. 12.

As can be seen from the address mapping 404, the data updating operation for the logical address 524287 changes the 2048$^{th}$ address mapping information of the address group G255. Thus, the processing circuit 126 performs the operation 650 to update the content of the address group G255 and records the updated address group G255 into an available physical page of the collateral addressing block 134A' associated with the primary addressing block 134A. For example, in the embodiment of FIG. 13, the processing circuit 126 may read the original content of the address group G255 from the page #255 of the addressing block 134A, and changes the address mapping information for the logical address 524287 from the original physical address (i.e., the physical page #88 of the data block #41 in this case) to the new physical address (i.e., the physical page #17 of the data block #2972 in this case).

Then, the processing circuit 126 writes content of the updated address group G255 into an available physical page #1 of the addressing block 134A'. For example, the processing circuit 126 writes the first address mapping information of the updated address group G255 (i.e., data block #610 and physical page #108 in this case) and a corresponding data validity mark into the first position of the physical page #1 of the addressing block 134A' as an information unit 1306, then writes the second address mapping information of the updated address group G255 and a corresponding data validity mark into the second position of the physical page #1 of the addressing block 134A' as another information unit, and so forth. Thus, the 2048th address mapping information of the updated address group G255 (i.e., data block #2972 and physical page #17 in this case) and a corresponding data validity mark would be recorded in the 2048th position of the physical page #1 of the addressing block 134A' as an information unit 1308.

The operation of updating the content of the address group G255 into the physical page #1 of the addressing block 134A' renders the allocation information for the address group G255 recorded in the address group allocation table 920 obsolete. Thus, the processing circuit 126 performs the operation 660 to records the new allocation information for the updated address group G255 in the management block 136A. For example, the processing circuit 126 may read the original content of the address group allocation table 920 from the management block 136A, and change the allocation information for the address group G255 from the original one (i.e., addressing block type 1 and physical page #255 in this case) to the new one (i.e., addressing block type 2 and physical page #1 in this case). Then, the processing circuit 126 writes the new allocation information for the address group G255 and original allocation information for other address groups into the management block 136A to form an updated address group allocation table 930 as illustrated in FIG. 9.

If the host device 110 afterward requests the controller 120 to erase (or delete) data with respect to particular logical address, the processing circuit 126 performs the operation 650 of FIG. 6 to update the address group related to the particular logical address, but would not erase the data stored in physical pages of the data blocks currently mapping to the particular logical address right away.

For example, if the host device 110 requests the controller 120 to erase (or delete) data with respect to logical addresses 522240~526335, the processing circuit 126 updates the content of the address groups G255 and G256 containing address mapping information for those logical addresses 522240~526335 in response to the data erase (deletion) commands from the host device 110. In one embodiment illustrated in FIG. 14, the processing circuit 126 copies all address mapping information in the address group G255 from the physical page #1 of the addressing block 134A' into an available physical page #2 of the addressing block 134A' and set their data validity marks to a second predetermined value, such as 1, representing that the data stored in the physical page, to which the address mapping information points, is "virtually erased". Then, the processing circuit 126 copies all address mapping information in the address group G256 from the physical page #0 of the addressing block 134B into an available physical page #0 of the collateral addressing block 134B' and set their data validity marks to 1.

Accordingly, information units stored in the physical page #2 of the addressing block 134A' are similar to those stored in the physical page #1 of the addressing block 134A', but differ in the value of the data validity marks. Also, information units stored in the physical page #0 of the addressing block 134B' are similar to those stored in the physical page #0 of the addressing block 134B, but differ in the value of the data validity marks.

In another embodiment, the processing circuit 126 only sets those data validity marks in the physical page #2 of the addressing block 134A' to 1, and does not copy the other content of the address group G255 into the physical page #2 of the addressing block 134A'. Also, the processing circuit 126 only sets those data validity marks in the physical page #0 of the addressing block 134B' to 1 without copying the other content of the address group G256 into the physical page #0 of the addressing block 134B'. As a result, the updating and relocation operations for the related address groups may be further expedited while reducing the memory requirement during updating these address groups.

In other words, when the host device 110 requests the controller 120 to erase (or delete) data with respect to particular logical addresses, the processing circuit 126 may simply write updated address groups into collateral addressing blocks without conducting traditional erasing operations on related data blocks. The use of data validity marks offers the controller 120 more freedom on deciding when to conduct actual erasing operations on related data blocks, so the controller 120 needs not to conduct actual erasing operations on related data blocks right away after receiving the erase (deletion) command from the host device 110. As a result, the frequency of block erasing operations for the flash memory module 130 can be effectively reduced, thereby greatly improving the accessing performance of the flash memory module 130.

When the host device 110 later issues a read command with respect to a particular logical address, the processing circuit 126 would perform the address translation method illustrated in the flowchart 1000 to look up the address mapping information for the particular logical address. If the processing circuit 126 detects that the data validity mark contained in the address mapping information for the particular logical address is set to 1, the processing circuit 126 would simply transmit dummy data to the host device 110 via the communication interface 128.

The operation of updating the content of the address groups G255 and G256 renders the allocation information for the address groups G255 and G256 recorded in the address group allocation table 930 obsolete. Thus, the processing circuit 126 performs the operation 660 to records the new allocation information for the updated address groups G255 and G256 in the management block 136A. The processing circuit 126 may read the content of the address group allocation table 930 from the management block 136A, change the allocation information for the address group G255 from the original one (i.e., addressing block type 2 and physical page #1 in this case) to the new one (i.e., addressing block type 2 and physical page #2 in this case), and change the allocation information for the address group G256 from the original one (i.e., addressing block type 1 and physical page #0 in this case) to the new one (i.e., addressing block type 2 and physical page #0 in this case). Then, the processing circuit 126 writes the new allocation information for the address groups G255 and G256 and original allocation information for other address groups into the management block 136A to form an updated address group allocation table 940 as illustrated in FIG. 9.

In this embodiment, the processing circuit 126 may clean a paired collateral addressing block 134x' and associated primary addressing block 134x when the collateral addressing block 134*x*' is filled with updated address groups. For example, if the collateral addressing block 134B' is filled with updated address groups in the later stage, the processing circuit 126 would copy all valid address groups stored in the paired collateral addressing block 134B' and associated primary addressing block 134B into an available target addressing block 134, and set the target addressing block 134 as a new primary addressing block 134B for recording address groups G256 G511. The processing circuit 126 then controls the flash memory module 130 to perform block erasing operations on the original primary addressing block 134B and the original collateral addressing block 134B', and may assign one of the erased addressing blocks as a new collateral addressing block 134B' for the new primary addressing block 134B.

In another embodiment, the processing circuit 126 would clean a paired collateral addressing block 134*x*' and associated primary addressing block 134*x* when the available physical pages of the collateral addressing block 134*x*' is less than a predetermined number, such as 5.

Since the operation of cleaning a particular addressing block pairing changes the allocation of address groups managed by the addressing block pairing, the processing circuit 126 would perform the operation 660 to write the new allocation information for the address groups managed by the particular addressing block pairing and original allocation information for other address groups into the management block 136A to form a new address group allocation table.

In the following, another embodiment of maintaining address mapping information for logical addresses will be described with reference to FIG. 15 through FIG. 23.

Figure 15:
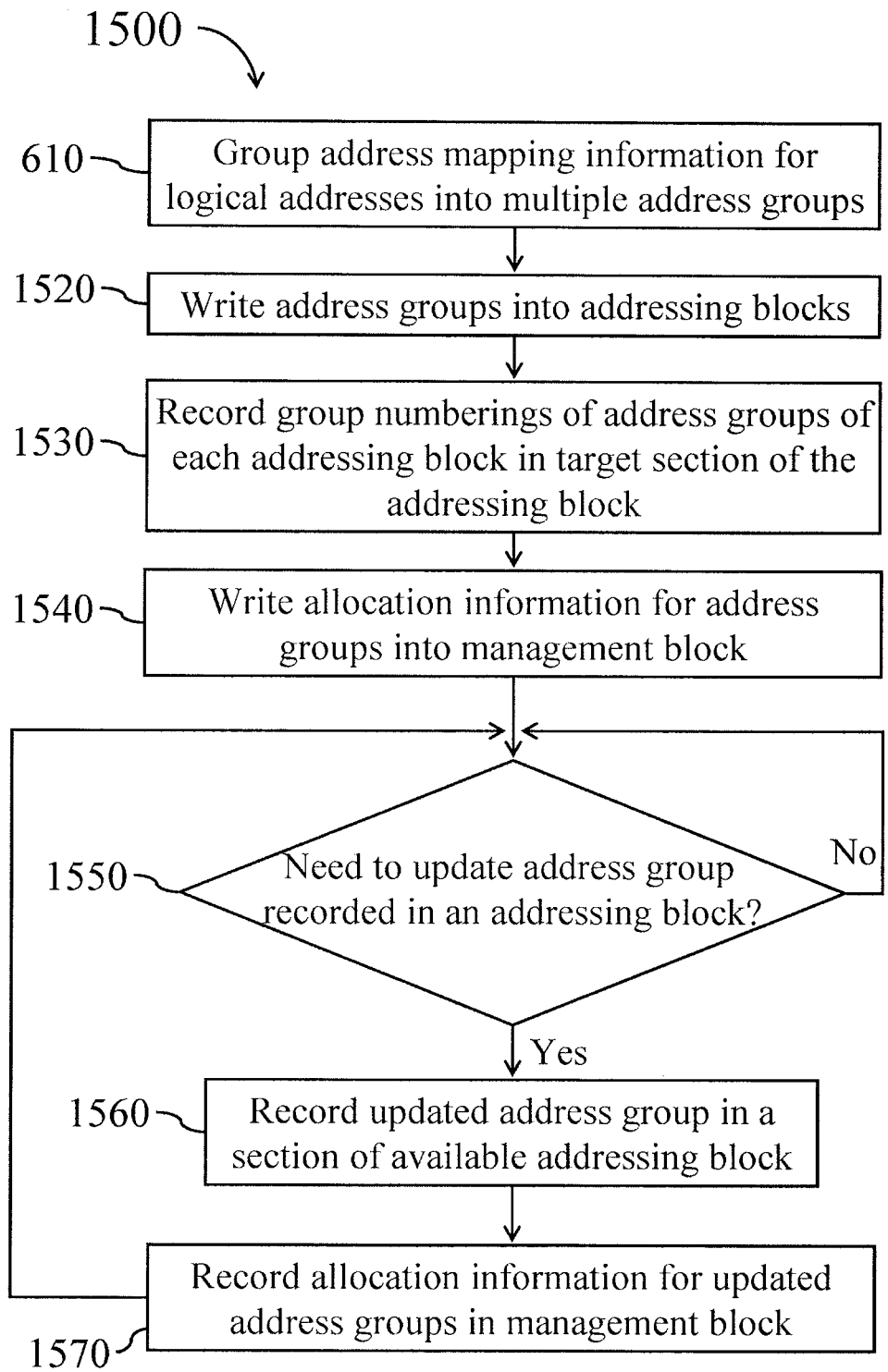
FIG. 15 is a simplified flowchart illustrating a method for maintaining address mapping information for logical addresses in accordance with a second exemplary embodiment.
Figure 16:
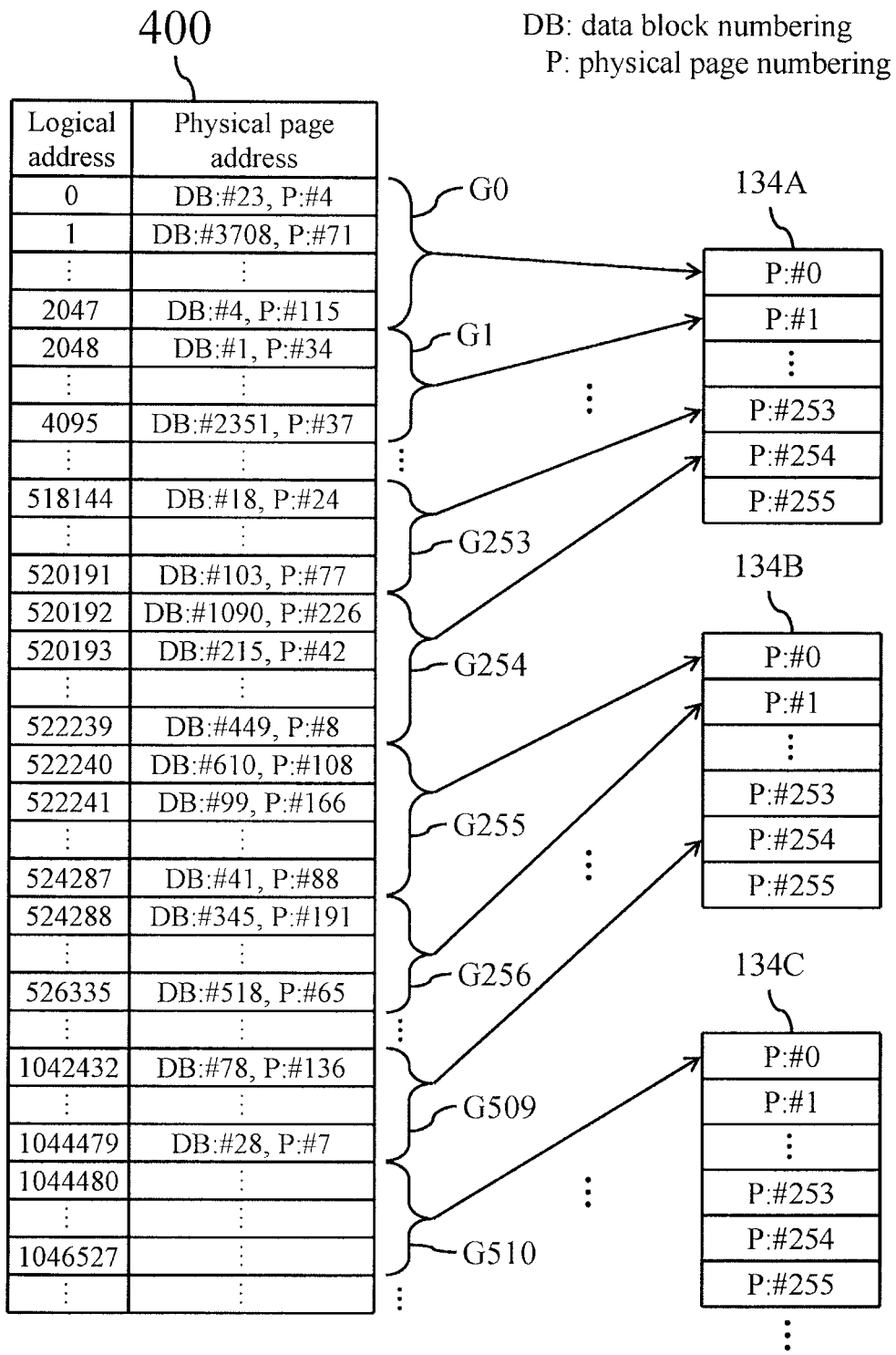
FIG. 16 is a schematic diagram of writing address mapping information for logical addresses into addressing blocks in accordance with a second exemplary embodiment.

FIG. 15 shows a simplified flowchart 1500 illustrating a method for maintaining address mapping information for logical addresses in accordance with a second exemplary embodiment. FIG. 16 shows a schematic diagram of writing address mapping information for the logical addresses into the addressing blocks 134 in accordance with a second exemplary embodiment.

The operation 610 of the flowchart 1500 is principally the same as the operation 610 of the flowchart 600 illustrated above. In the embodiment shown of FIG. 16, the address mapping information for each logical address is a physical address represented by the combination of a data block location information (e.g., data block numbering) and a physical page location information (e.g., page numbering), and the processing circuit 126 groups 2048 address mapping information for every 2048 sequential logical addresses as an address group. Accordingly, each address group contains 2048 physical addresses mapping to 2048 sequential logical addresses. For example, the processing circuit 126 groups the first set of 2048 physical addresses mapping to sequential logical addresses 0~2047 as an address group G0, groups a next set of 2048 physical addresses mapping to sequential logical addresses 2048~4095 as an address group G1, and so forth.

In operation 1520, the processing circuit 126 writes the content of the address groups into the addressing blocks 134. For the purpose of explanatory convenience in the following description, it is assumed that each addressing block 134 has 256 physical pages denoted by #0-#255. The processing circuit 126 in the operation 1520 may record the content of each of the address groups G0~G254 in a section of the addressing block 134A, records the content of each of the address groups G255~G509 in a section of another addressing block 134B, records the content of each of the address groups G510~G764 in a section of yet another addressing block 134C, and so forth.

Figure 17:
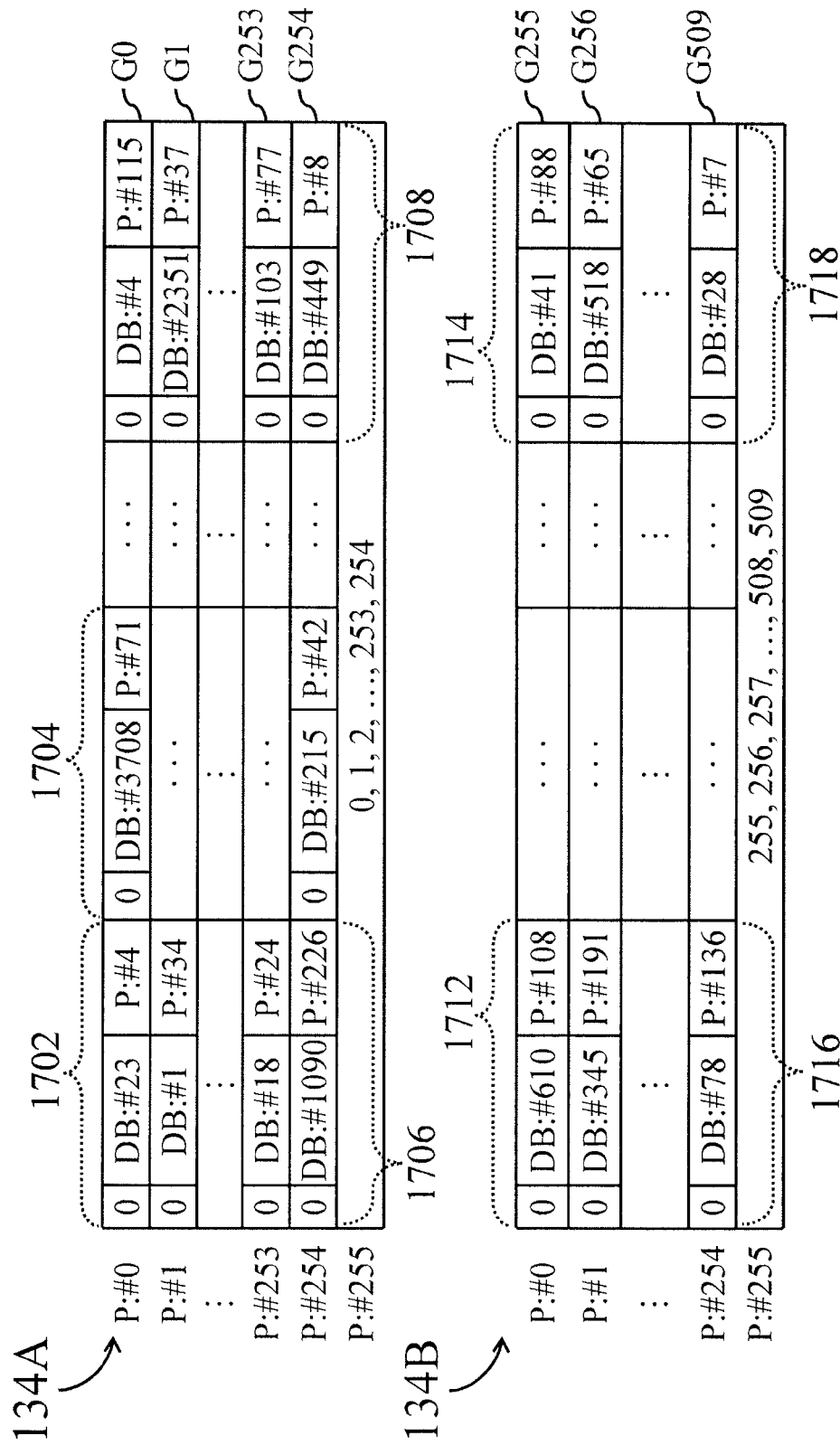
FIG. 17 is a schematic diagram of address mapping information recorded in addressing blocks in accordance with a second exemplary embodiment.

In the embodiment of FIG. 16, the processing circuit 126 records the content of each of the address groups G0~G254 in a physical page of the addressing block 134A in an order based on the address order of the corresponding 2048 logical addresses. As illustrated in FIG. 17, for example, the processing circuit 126 writes the first address mapping information of the address group G0 (i.e., data block #23 and physical page #4 in this case) and a data validity mark of the first address mapping information into the first position of the physical page #0 of the addressing block 134A as an information unit 1702, writes the second address mapping information of the address group G0 (i.e., data block #3708 and physical page #71 in this case) and a data validity mark of the second address mapping information into the second position of the physical page #0 of the addressing block 134A as an information unit 1704, and so forth. Thus, the 2048th address mapping information of the address group G0 and a corresponding data validity mark would be recorded in the 2048th position of the physical page #0 of the addressing block 134A as an information unit. In implementations, the address mapping information for each logical address may be recorded with any suitable size, such as a longword.

Similarly, the processing circuit 126 writes the first address mapping information of the address group G254 (i.e., data block #1090 and physical page #226 in this case) and a corresponding data validity mark into the first position of the physical page #254 of the addressing block 134A as an information unit 1706, and writes the 2048th address mapping information of the address group G254 (i.e., data block #449 and physical page #8 in this case) and a corresponding data validity mark into the 2048th position of the physical page #254 of the addressing block 134A as an information unit 1708.

In addition, the processing circuit 126 also writes the first address mapping information of the address group G255 (i.e., data block #610 and physical page #108 in this case) and a corresponding data validity mark into the first position of the physical page #0 of the addressing block 134B as an information unit 1712, and writes the 2048th address mapping information of the address group G255 (i.e., data block #41 and physical page #88 in this case) and a corresponding data validity mark into the 2048th position of the physical page #0 of the addressing block 134B as an information unit 1714.

Similarly, the processing circuit 126 writes the first address mapping information of the address group #509 (i.e., data block #78 and physical page #136 in this case) and a corresponding data validity mark into the first position of the physical page #254 of the addressing block 134B as an information unit 1716, and writes the 2048th address mapping information of the address group #509 (i.e., data block #28 and physical page #7 in this case) and a corresponding data validity mark into the 2048th position of the physical page #254 of the addressing block 134B as an information unit 1718.

The processing circuit 126 continues writing the content of the other address groups into the other addressing blocks 134 as described above until all the address groups are completely recorded in the addressing blocks 134. In the embodiment of FIG. 17, the processing circuit 126 sets the data validity mark of each address mapping information of the address groups a first predetermined value, 0, representing that the data stored in the physical page, to which the address mapping information points, is valid. As a result, an initial address mapping of physical addresses onto logical addresses is established and stored in the addressing blocks 134.

Similar to the previous embodiments, in an address group the address mapping information for sequential logical addresses are sorted by the sequence of the logical addresses. In addition, the position, in which an address mapping information for a particular logical address is positioned, corresponds to the sequence of the particular logical address among the sequential logical addresses mapping to the address group. For example, in an address group mapping to 2048 sequential logical addresses, the address mapping information for the Nth logical address among the 2048 logical addresses is positioned in the Nth position of the address group. Therefore, there is no need to records the logical addresses in the address group.

In operation 1530, the processing circuit 126 records group numberings of address groups stored in each addressing block 134 in a target section of the addressing block 134. The processing circuit 126 may reserve the last physical page #255 of each addressing block 134 as a target section. For example, when the processing circuit 126 has finished writing address groups G0~G254 into all the other physical pages of the addressing block 134A, the processing circuit 126 writes group numberings of the address groups G0~G254 into the physical page #255 of the addressing block 134A in order based on the physical locations in which those address groups G0~G254 are stored.

In the embodiment shown in FIG. 17, the physical page #255 of the addressing block 134A contains a group numbering sequence 0, 1, 2, . . . , 235, and 254 corresponding to the address groups G0~G254 stored in the other physical pages of the addressing block 134A, and the position of each group numbering recorded in the physical page #255 represents the physical page where the corresponding address group is stored.

Similarly, when the processing circuit 126 has finished writing address groups G255~G509 into the other physical pages of the addressing block 134B, the processing circuit 126 performs the operation 1530 to write group numberings of address groups G255~G509 into the physical page #255 of the addressing block 134B in an order based on the physical locations in which those address groups G255~G509 are stored. As shown in FIG. 17, the physical page #255 of the addressing block 134B contains a group numbering sequence 255, 256, 257, . . . , 508, and 509 corresponding to the address groups G255~G509 stored in the other physical pages of the addressing block 134B, and the position of each group numbering recorded in the physical page #255 represents the physical page where the corresponding address group is stored.

Accordingly, based on the group numbering sequence stored in the target section of an addressing block 134, the processing circuit 126 is able to easily and rapidly obtain group numberings of all address groups stored in the addressing block 134 and the physical pages in which those address groups are respectively stored. Take the addressing block 134A as an example; the third place of the group numbering sequence stored in the physical page #255 of the addressing block 134A is recorded with a group numbering 2. Thus, the processing circuit 126 may learn from the position of the group numbering 2 in the group numbering sequence that the address group G2 is stored in the third physical page of the addressing block 134A, i.e., the physical page #2 in this case.

In this embodiment, each addressing block 134 can be utilized to store content of 255 address groups, and each address group contains 2048 physical addresses mapping to 2048 sequential logical addresses. If a particular address group is originally stored in an addressing block 134x (x is A, B, C, . . . ), the processing circuit 126 may record the updated versions of the particular address group in any available addressing block 134 with available physical pages. Accordingly, each addressing block 134 is able to manage up to 522,240 (=255*2048) physical addresses of the data blocks 132. If each physical address points to a physical page whose page size is 8 KB, then the controller 120 could utilize each addressing block 134 to manage address mapping for a memory in size of 4,171,920 KB, which approximates 4 GB. With more addressing blocks 134, the controller 120 is able to manage a much larger flash memory.

Since the address groups are respectively recorded in multiple addressing blocks 134, the processing circuit 126 also maintains the allocation information for all address groups so that it can locate a particular address group when needed.

Figure 18:
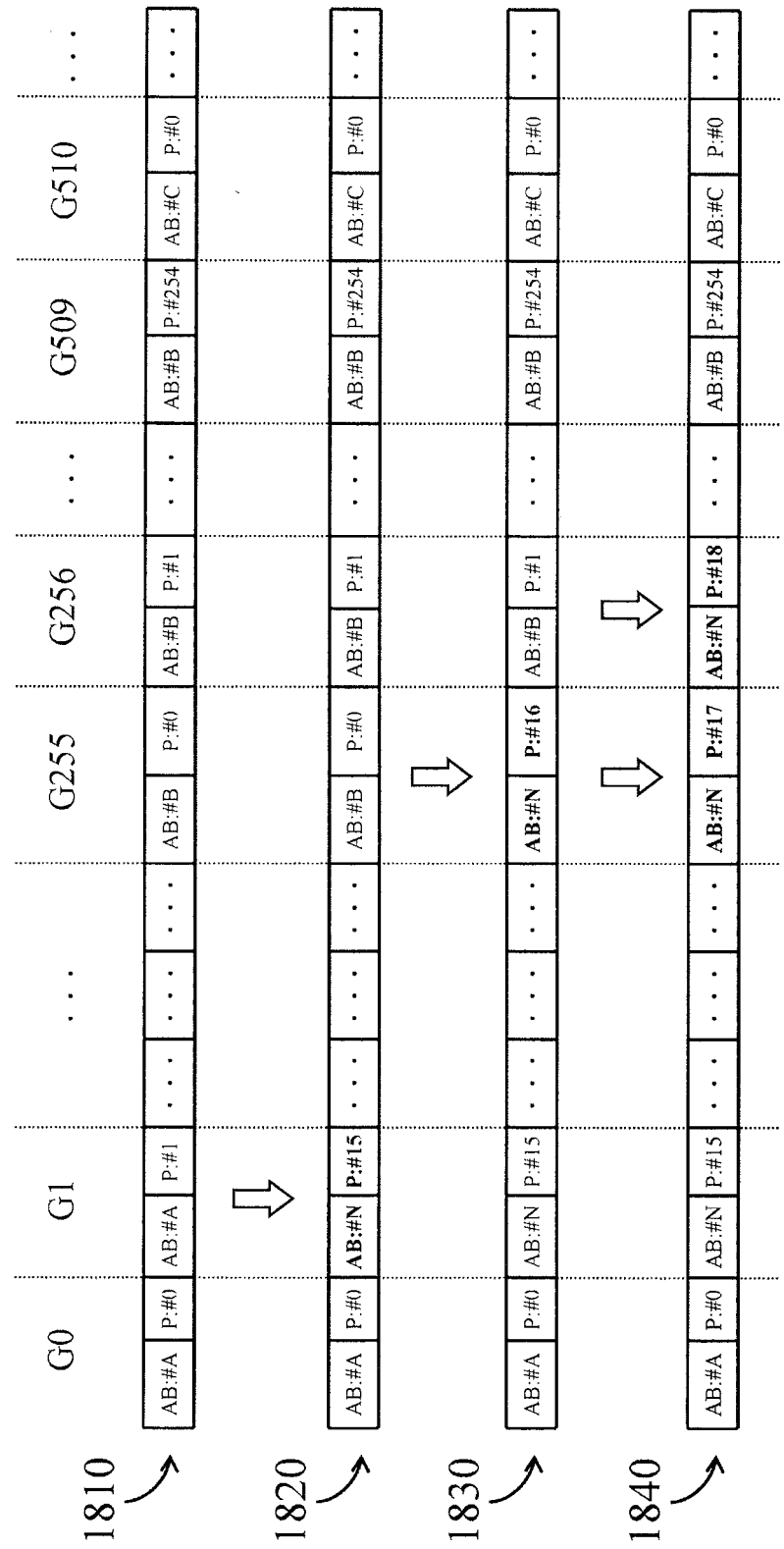
FIG. 18 is a schematic diagram of address group allocation tables for storing address group allocation information according to a second exemplary embodiment.

In operation 1540, the processing circuit 126 writes allocation information for address groups into the management block 136A. The processing circuit 126 may write allocation information for all address groups into the management block 136A in order based on the numberings of address groups to form an initial address group allocation table 1810 as illustrated in FIG. 18. In the embodiment of FIG. 18, the allocation information for each of the address groups is a physical address represented by the combination of an addressing block location information (e.g., addressing block numbering) and page location information (e.g., physical page numbering). As shown, the processing circuit 126 writes the allocation information for the first address group G0 into the first position of the address group allocation table 1810, writes the address allocation information for the second address group G1 into the second position of the address group allocation table 1810, writes the address allocation information for the third address group G2 into the third position of the address group allocation table 1810, and so forth. Thus, the allocation information for the 510th address group G509 would be recorded in the 510th position of the address group allocation table 1810. In implementations, the allocation information for each address group may be recorded in any suitable size, e.g., a longword.

In other words, the processing circuit 126 sorts the allocation information for address groups in the address group allocation table 1810 by the sequence of the group numberings of the address groups. As a result, the position, in which the allocation information for a particular address group is positioned, corresponds to the group numbering of the particular address group. Therefore, there is no need to record the group numberings of respective address groups in the address group allocation table 1810.

Since the address groups containing address mapping information for the logical addresses are stored in the addressing blocks 134, and the allocation information for address groups are stored in the management block 136A, the address mapping information for the flash memory module 130 will not disappear after powered off, such as disconnected with the host device 110. Accordingly, the processing circuit 126 of the controller 120 needs not to recollect all address mapping information for the logical addresses and allocation information for address groups in the initialization procedure next time when the flash memory module 130 is powered on or connected to the host device 110. As a result, the time required for initializing the flash memory module 130 can be effectively reduced.

Figure 19:
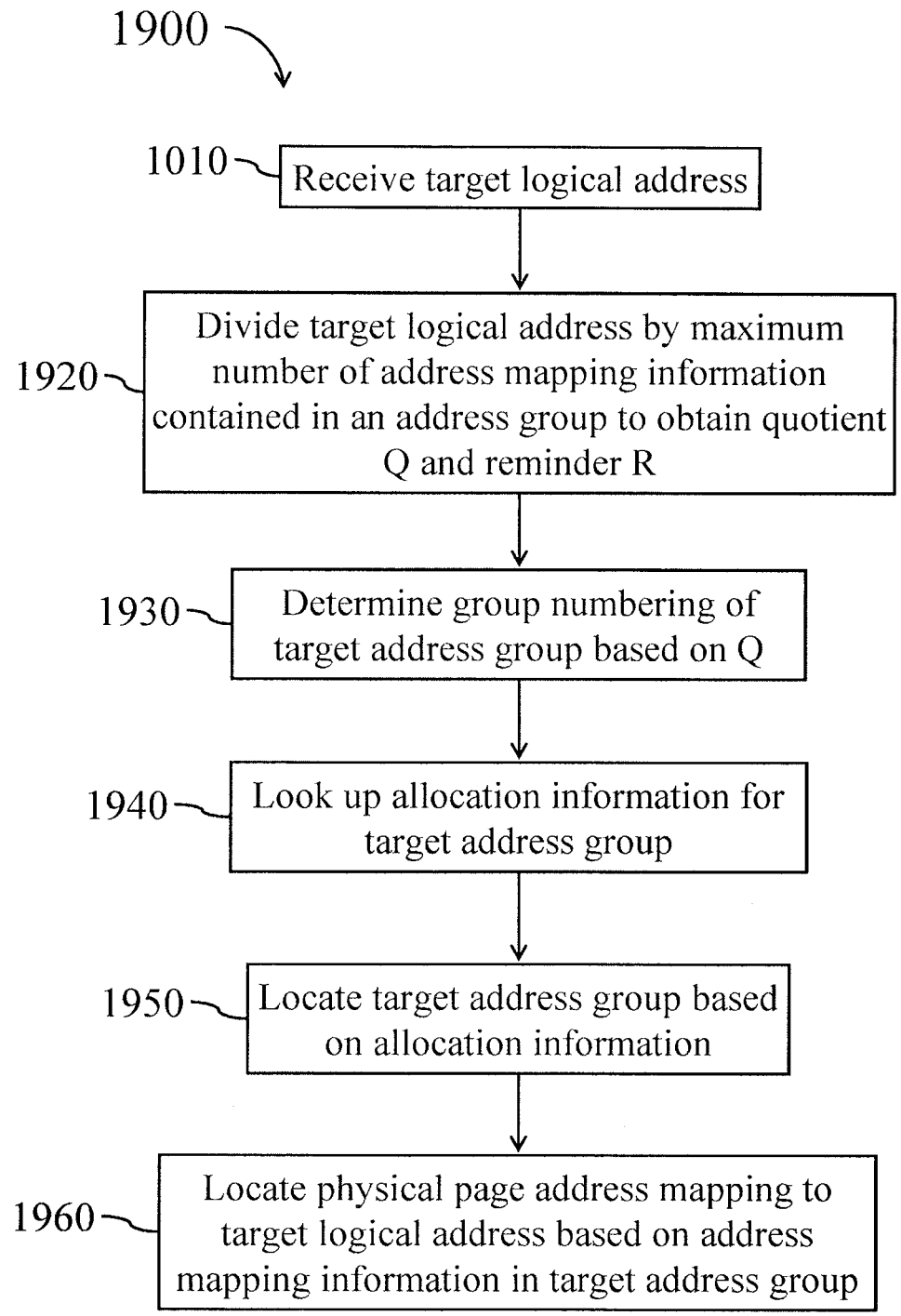
FIG. 19 is a simplified flowchart illustrating a method for translating a logical address into a corresponding physical address in accordance with a second exemplary embodiment.

Before entering the descriptions for operations 1550 through 1570 of the flowchart 1500, the logical address to physical address conversion conducted by the processing circuit 126 of this embodiment will be explained first. When the communication interface 128 receives an access command with respect to a particular logical address from the host device 110, the processing circuit 126 translates the logical address into a corresponding physical address with reference to the address group allocation information stored in the management block 136A and the address mapping information stored in the addressing blocks 134. FIG. 19 is a simplified flowchart 1900 illustrating a method for translating a logical address into a corresponding physical address in accordance with a second exemplary embodiment.

The operation 1010 of the flowchart 1900 is principally the same as the operation 1010 of the flowchart 1000, and thus the descriptions for the operation 1010 of the flowchart 1000 also applied here. For the purpose of explanatory convenience in the following description, it is assumed that the target logical address received from the host device 110 is the logical address 520193.

In operation 1920, the processing circuit 126 divides the target logical address by the maximum number of address mapping information contained in an address group to obtain a quotient Q and a reminder R. In this embodiment, the maximum number of address mapping information contained in an address group is 2048. Accordingly, the processing circuit 126 divides 520193 by 2048 and obtains a quotient 254 and a reminder 1.

In operation 1930, the processing circuit 126 determines the group numbering of a target address group containing the address mapping information for the target logical address based on the quotient Q. Since the quotient Q obtained in the operation 1920 is 254, the processing circuit 126 determines that the target address group containing the address mapping information for the target logical address 520193 is the 255th address group G254, whose group numbering is 254 in this case.

In operation 1940, the processing circuit 126 looks up allocation information for the target address group. Since the target address group G254 is the 255th address group, the processing circuit 126 determines that the allocation information for the target address group G254 is stored in the 255th position of the latest address group allocation table stored in the management block 136A. In this case, the latest address group allocation table stored in the management block 136A is the address group allocation table 1810, and the allocation information in the 255th position of the address group allocation table 1810 is recorded with addressing block #A and physical page #254.

In operation 1950, the processing circuit 126 locates the target address group based on the allocation information. The processing circuit 126 could determine which physical page of the addressing block is utilized for recording the latest content of the target address group G254 based on the allocation information for the target address group. Since the allocation information for the address group G254 is recorded with addressing block #A and physical page #254, the processing circuit 126 determines that the content of the address group G254 is recorded in the physical page #254 of the addressing block 134A.

In operation 1960, the processing circuit 126 locates a physical page address mapping to the target logical address based on the address mapping information in the target address group. Since the reminder R obtained in the operation 1920 is 1, the processing circuit 126 determines that the address mapping information for the target logical address 520193 is stored in the second position of the target address group G254. As shown in FIG. 17, the address mapping information in the second position of the target address group G254 is recorded with data block #215 and physical page #42. Accordingly, the processing circuit 126 translates the target logical address 520193 into the physical page #42 of the data block #215.

Similar to the previous embodiment, the processing circuit 126 does not buffer all valid address mapping information recorded in the addressing blocks 134 in the volatile memory 122 during operations. Instead, the processing circuit 126 may buffer partial address mapping information of different address groups in the volatile memory 122 and perform the address translation operations illustrated in FIG. 19 to access the flash memory module 130 based on the address mapping information buffered in the volatile memory 122.

In one embodiment, for example, the processing circuit 126 divides each address group into multiple mapping information segments and buffers only some mapping information segments, respectively selected from different address groups, in the volatile memory 122. When the host device 110 requests to access a particular logical address, if a particular mapping information segment currently buffered in the volatile memory 122 contains the address mapping information for the particular logical address, the processing circuit 126 would convert the particular logical address into corresponding physical page address based on the particular mapping information segment buffered in the volatile memory 122 instead of retrieving the address mapping information from the addressing blocks 134. On the other hand, if none of the mapping information segments currently buffered in the volatile memory 122 contains the address mapping information for the particular logical address, the processing circuit 126 would retrieve a valid address mapping information for the particular logical address from the addressing blocks 134 and perform the address translation operation based on valid address mapping information. In addition, the processing circuit 126 may use any suitable mechanism to update the address mapping information in the volatile memory 122. For example, the processing circuit 126 may discard a mapping information segment with least utilization frequency from the volatile memory 122 and buffer a target mapping information segment containing the valid address mapping information for the particular logical address in the volatile memory 122. Since the processing circuit 126 only needs to buffer a very small portion of all valid physical addresses stored in the addressing blocks 134 in the volatile memory 122 for supporting the address translation operations, the required memory capacity for the volatile memory 122 can be significantly reduced.

Please refer back to FIG. 15. As described previously, when data with respect to a certain logical address is updated or erased, the address mapping between logical addresses and physical addresses changes, thereby rendering the original address mapping for the logical address obsolete or invalid. Therefore, the processing circuit 126 in the operation 1550 determines which address group recorded in the addressing blocks 134 needs to be updated when data updating and erasing operation occurs. Once the processing circuit 126 finished a data updating or data erasing operation with respect to a particular logical address, the processing circuit 126 determines that the corresponding address group should be updated in the operation 1550 and then proceed to the operation 1560.

In the operation 1560, the processing circuit 126 updates the specific address group containing the obsolete address mapping information for the particular logical address and records the updated address group in a section of an available addressing block 134 having available physical pages. The operation 1560 will be described with reference to FIG. 20 through FIG. 23.

Figure 20:
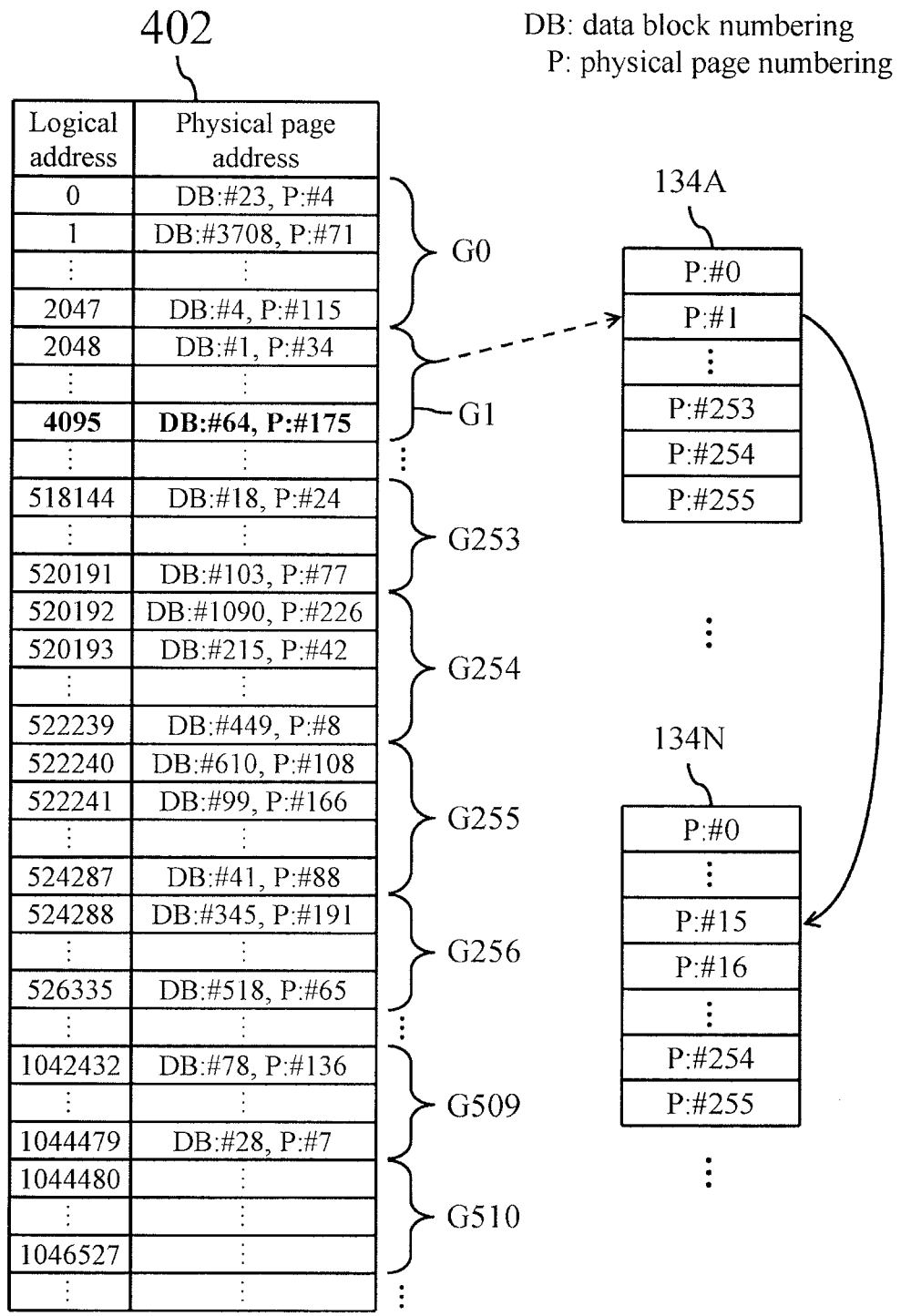
FIG. 20 and FIG. 21 are schematic diagrams of updating address mapping information for logical addresses in accordance with a second exemplary embodiment.
Figure 21:
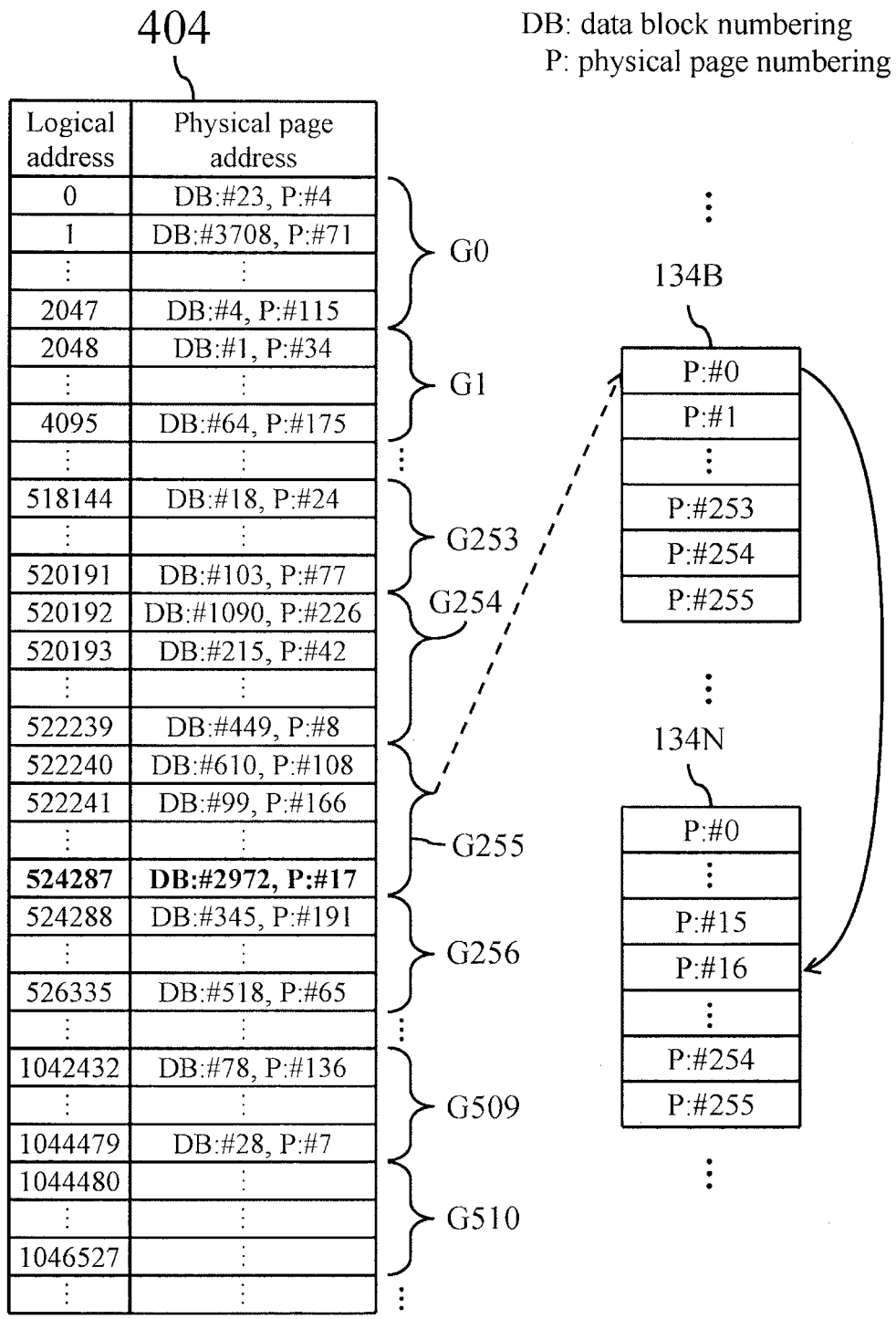
Figure 22:
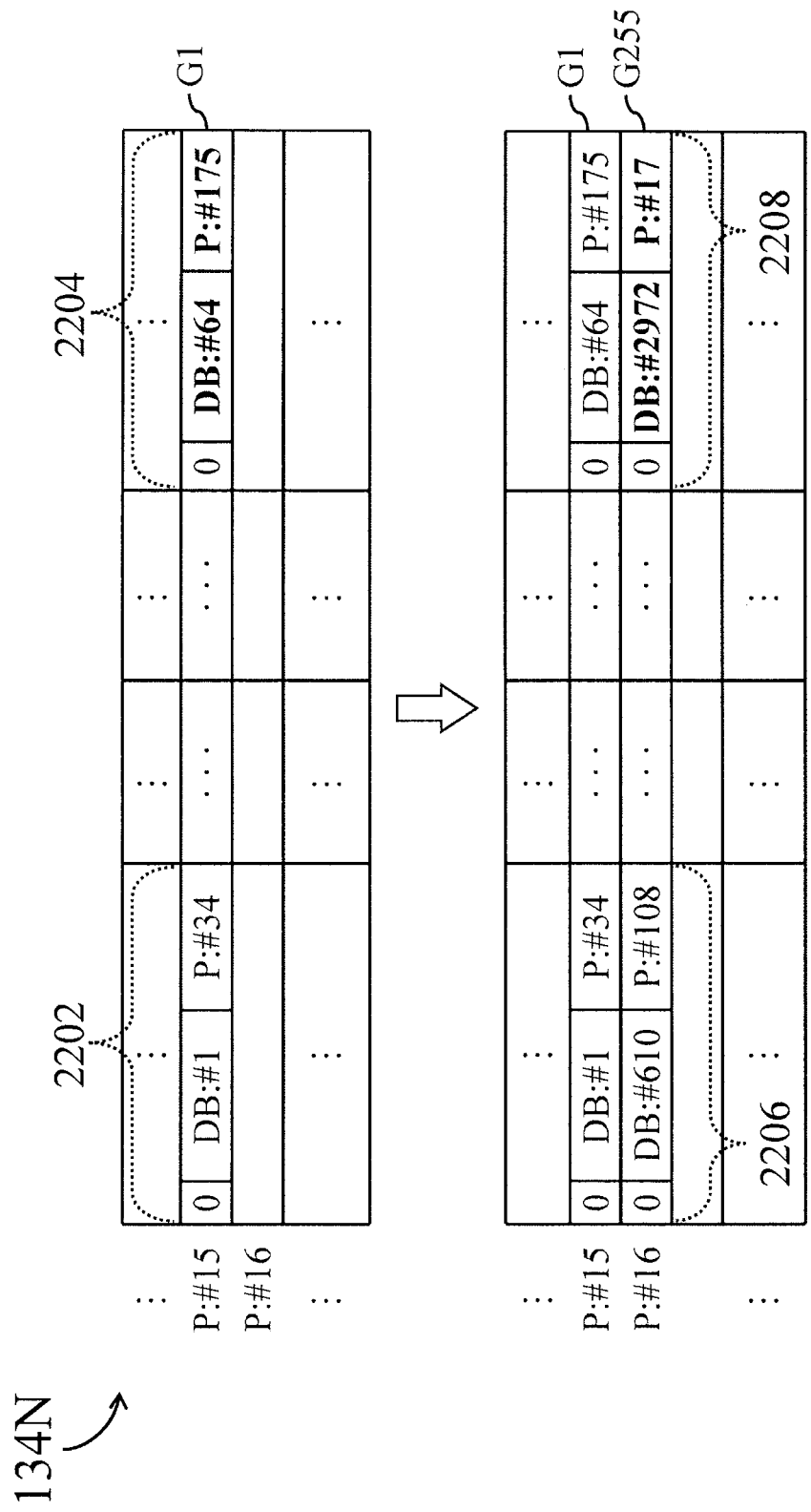

FIG. 20 and FIG. 21 are schematic diagrams of updating address mapping information for logical addresses in accordance with a second exemplary embodiment. As shown in FIG. 20, after writing new data with respect to the logical address 4095 into the physical page #175 of the data block #64, the physical address previously mapping to the logical address 4095 (i.e., the physical page #37 of the data block #2351) becomes invalid, and the current valid physical address mapping to the logical address 4095 is the physical page #175 of the data block #64. As can be seen from the address mapping 402 of FIG. 20 that the data updating operation changes the content of the address group G1.

Thus, the processing circuit 126 in the operation 1560 updates the content of the address group G1 and records the updated address group G1 into an available physical page of an available addressing block 134. For example, in the embodiment of FIG. 20, the processing circuit 126 may read the original content of the address group G1 from the page #1 of the addressing block 134A, and change the address mapping information for the logical address 4095 from the original physical address (i.e., the physical page #37 of the data block #2351 in this case) to the new physical address (i.e., the physical page #175 of the data block #64 in this case).

Then, the processing circuit 126 writes content of updated address group G1 into an available physical page #15 of an available addressing block 134N. In the embodiment shown in FIG. 22, the processing circuit 126 writes the first address mapping information of the updated address group G1 (i.e., data block #1 and physical page #34 in this case) and a corresponding data validity mark into the first position of the physical page #15 of the addressing block 134N as an information unit 2202, then writes the second address mapping information of the updated address group G1 and a corresponding data validity mark into the second position of the physical page #15 of the addressing block 134N as another information unit, and so forth. Thus, the 2048th address mapping information of the updated address group G1 (i.e., data block #64 and physical page #175 in this case) and a corresponding data validity mark would be recorded in the 2048th position of the physical page #15 of the addressing block 134N as an information unit 2204.

The operation of updating the content of the address group G1 into the physical page #15 of the addressing block 134N renders the allocation information for the address group G1 recorded in the initial address group allocation table 1810 obsolete. Thus, the processing circuit 126 performs the operation 1570 to records the new allocation information for the updated address group G1 in the management block 136A. For example, the processing circuit 126 may read the original content of the address group allocation table 1810 from the management block 136A, and change the allocation information for the address group G1 from the original one (i.e., addressing block #A and physical page #1 in this case) to the new setting (i.e., addressing block #N and physical page #15 in this case). Then, the processing circuit 126 writes the new allocation information for the address group G1 and original allocation information for other address groups into the management block 136A to form an updated address group allocation table 1820 as illustrated in FIG. 18.

Afterward, if the processing circuit 126 writes updated data for the logical address 524287 into the physical page #17 of the data block #2972 based on a request from the host device 110, the new address mapping of logical addresses onto physical addresses of the flash memory module 130 would become the address mapping 404 as shown in FIG. 21.

As can be seen from the address mapping 404, the data updating operation for the logical address 524287 changes the 2048th address mapping information of the address group G255. Thus, the processing circuit 126 performs the operation 1560 to update the content of the address group G255 and records the updated address group G255 into an available physical page of an available addressing block 134. For example, in the embodiment of FIG. 22, the processing circuit 126 may read the original content of the address group G255 from the page #0 of the addressing block 134B, and changes the address mapping information for the logical address 524287 from the original physical address (i.e., the physical page #88 of the data block #41 in this case) to the new physical address (i.e., the physical page #17 of the data block #2972 in this case).

Then, the processing circuit 126 writes content of the updated address group G255 into a next available physical page #16 of the addressing block 134N. For example, the processing circuit 126 writes the first address mapping information of the updated address group G255 (i.e., data block #610 and physical page #108 in this case) and a corresponding data validity mark into the first position of the physical page #16 of the addressing block 134N as an information unit 2206, then writes the second address mapping information of the updated address group G255 and a corresponding data validity mark into the second position of the physical page #16 of the addressing block 134N as another information unit, and so forth. Thus, the 2048th address mapping information of the updated address group G255 (i.e., data block #2972 and physical page #17 in this case) and a corresponding data validity mark would be recorded in the 2048th position of the physical page #16 of the addressing block 134N as an information unit 2208.

The operation of updating the content of the address group G255 into the physical page #16 of the addressing block 134N renders the allocation information for the address group G255 recorded in the address group allocation table 1820 obsolete. Thus, the processing circuit 126 performs the operation 1570 to records the new allocation information for the updated address group G255 in the management block 136A. For example, the processing circuit 126 may read the original content of the address group allocation table 1820 from the management block 136A, and change the allocation information for the address group G255 from the original value (i.e., addressing block #B and physical page #0 in this case) to the new value (i.e., addressing block #N and physical page #16 in this case). Then, the processing circuit 126 writes the new allocation information for the address group G255 and original allocation information for other address groups into the management block 136A to form an updated address group allocation table 1830 as illustrated in FIG. 18.

If the host device 110 afterward requests the controller 120 to erase (delete) data with respect to particular logical address, the processing circuit 126 performs the operation 1560 of FIG. 15 to update the address group related to the particular logical address, but would not erase the data stored in physical pages of the data blocks currently mapping to the particular logical address right away.

For example, if the host device 110 requests the controller 120 to erase (delete) data with respect to logical addresses 522240~526335, the processing circuit 126 updates the content of the address groups G255 and G256 containing address mapping information for those logical addresses 522240~526335 in response to the data erase (deletion) commands from the host device 110. In one embodiment illustrated in FIG. 23, the processing circuit 126 copies all address mapping information of the address group G255 from the physical page #16 of the addressing block 134N into a next available physical page #17 of the addressing block 134N and set their data validity marks to a second predetermined value, such as 1, representing that the data stored in the physical page, to which the address mapping information points, is "erased". Then, the processing circuit 126 copies all address mapping information in the address group G256 from the physical page #1 of the addressing block 134B into a next available physical page #18 of the addressing block 134N and set their data validity marks to 1.

Accordingly, information units stored in the physical page #17 of the addressing block 134N are similar to those stored in the physical page #16 of the addressing block 134N, but differ in the value of the data validity marks. Also, information units stored in the physical page #18 of the addressing block 134N are similar to those stored in the physical page #1 of the addressing block 134B, but differ in the value of the data validity marks.

In another embodiment, the processing circuit 126 only sets those data validity marks in the physical page #17 of the addressing block 134N to 1, and does not copy the other content of the address group G255 into the physical page #17 of the addressing block 134N. Also, the processing circuit 126 only sets those data validity marks in the physical page #18 of the addressing block 134N to 1 without copying the other content of the address group G256 into the physical page #18 of the addressing block 134N. As a result, the updating and relocation operations for the address groups may be further expedited while reducing the memory requirement during the address updating operation.

In other words, when the host device 110 requests the controller 120 to erase (delete) data with respect to particular logical addresses, the processing circuit 126 may simply write updated address groups into available addressing blocks without conducting traditional erasing operations on related data blocks. The use of data validity marks offers the controller 120 more freedom on deciding when to conduct actual erasing operations on related data blocks, so the controller 120 needs not to conduct actual erasing operations on related data blocks every time an erase (deletion) command from the host device 110 is received. As a result, the frequency of block erasing operations for the flash memory module 130 can be effectively reduced, thereby greatly improving the accessing performance of the flash memory module 130.

When the host device 110 later issues a read command with respect to a particular logical address, the processing circuit 126 would perform the address translation method illustrated in the flowchart 1900 to look up the address mapping information for the particular logical address. If the processing circuit 126 detects that the data validity mark of the address mapping information for the particular logical address is set to 1, the processing circuit 126 would simply transmit dummy data to the host device 110 via the communication interface 128.

The operation of updating the content of the address groups G255 and G256 renders the allocation information for the address groups G255 and G256 recorded in the address group allocation table 1830 obsolete. Thus, the processing circuit 126 performs the operation 1570 to records the new allocation information for the updated address groups G255 and G256 in the management block 136A. The processing circuit 126 may read the content of the address group allocation table 1830 from the management block 136A, change the allocation information for the address group G255 from the original one (i.e., addressing block #N and physical page #16 in this case) to the new one (i.e., addressing block #N and physical page #17 in this case), and change the allocation information for the address group G256 from the original one (i.e., addressing block #B and physical page #1 in this case) to the new one (i.e., addressing block #N and physical page #18 in this case). Then, the processing circuit 126 writes the new allocation information for the address groups G255 and G256 and original allocation information for other address groups into the management block 136A to form an updated address group allocation table 1840 as illustrated in FIG. 18.

In this embodiment, there is no pairing structure for the addressing blocks 134, so the cleaning operation for the addressing blocks 134 differs from that of the previous embodiment. In this embodiment, the processing circuit 126 may monitor the validity situation of address groups stored in the addressing blocks 134 and determine whether to clean a particular addressing block 134 based on the validity situation of address groups stored in the particular addressing block 134.

Figure 24:
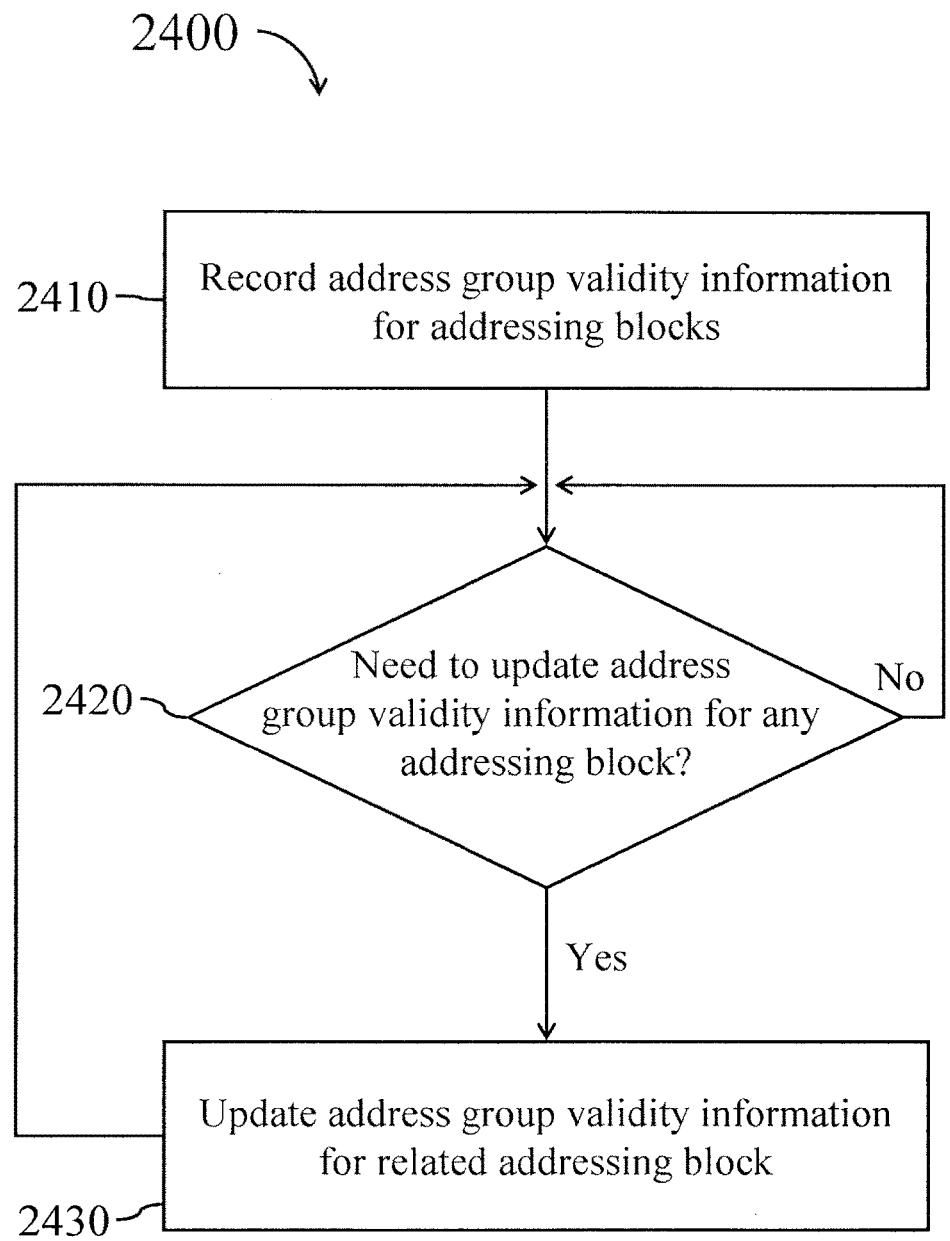
FIG. 24 is a simplified flowchart illustrating a method for monitoring group validity situation of addressing blocks in accordance with an exemplary embodiment.

Please refer to FIG. 24, which shows a simplified flowchart 2400 illustrating a method for monitoring address group validity situation of addressing blocks in accordance with an exemplary embodiment.

In operation 2410, the processing circuit 126 records and buffers address group validity information for each of the addressing blocks 134 in the volatile memory 122. In this embodiment, the processing circuit 126 may use a valid group count of a particular addressing block 134 to represent the address group validity information for the particular addressing block 134. Thus, when the physical pages of the particular addressing block 134 are filled with valid address groups, the maximum valid group count of the particular addressing block 134 is 255 as the last page of each addressing block 134 is reserved for storing a group numbering sequence.

The processing circuit 126 may calculate the valid group count of a particular addressing block 134 by inquiring the address group allocation table at the time based on the group numbering sequence stored in the particular addressing block 134. Take the aforementioned case, where the processing circuit 126 just established the initial address group allocation table 1810 as illustrated in FIG. 18, as an example. At that time, as described above, the processing circuit 126 could easily obtain group numberings of all address groups G0~G254 stored in the addressing block 134A and the physical pages, in which those address groups G0~G254 are respectively stored, based on the group numbering sequence stored in the physical page #255 of the addressing block 134A. The processing circuit 126 may compare the allocation information for address groups G0~G254 obtained from the group numbering sequence stored in the addressing block 134A with the allocation information for address groups G0~G254 recorded in the initial address group allocation table 1810. For example, the processing circuit 126 may set an initial valid group count of the addressing block 134A to 0 and increase the valid group count by 1 once the allocation information for a particular address group obtained from the group numbering sequence stored in the addressing block 134A is found matching with the allocation information for the particular address group recorded in the initial address group allocation table 1810. Then the processing circuit 126 repeats the allocation information comparison for every other address group. Alternatively, the processing circuit 126 may set an initial valid group count of the addressing block 134A to 255, decrease the valid group count by 1 once the allocation information for a particular address group obtained from the group numbering sequence stored in the addressing block 134A is found not matching with the allocation information for the particular address group recorded in the initial address group allocation table 1810, and then repeat the allocation information comparison for every next address group. In this case, since the allocation information for all address groups G0~G254 obtained from the group numbering sequence stored in the addressing block 134A are matching with that recorded in the initial address group allocation table 1810, the processing circuit 126 would obtain a valid group count, 255, for the addressing block 134A.

Figure 25:
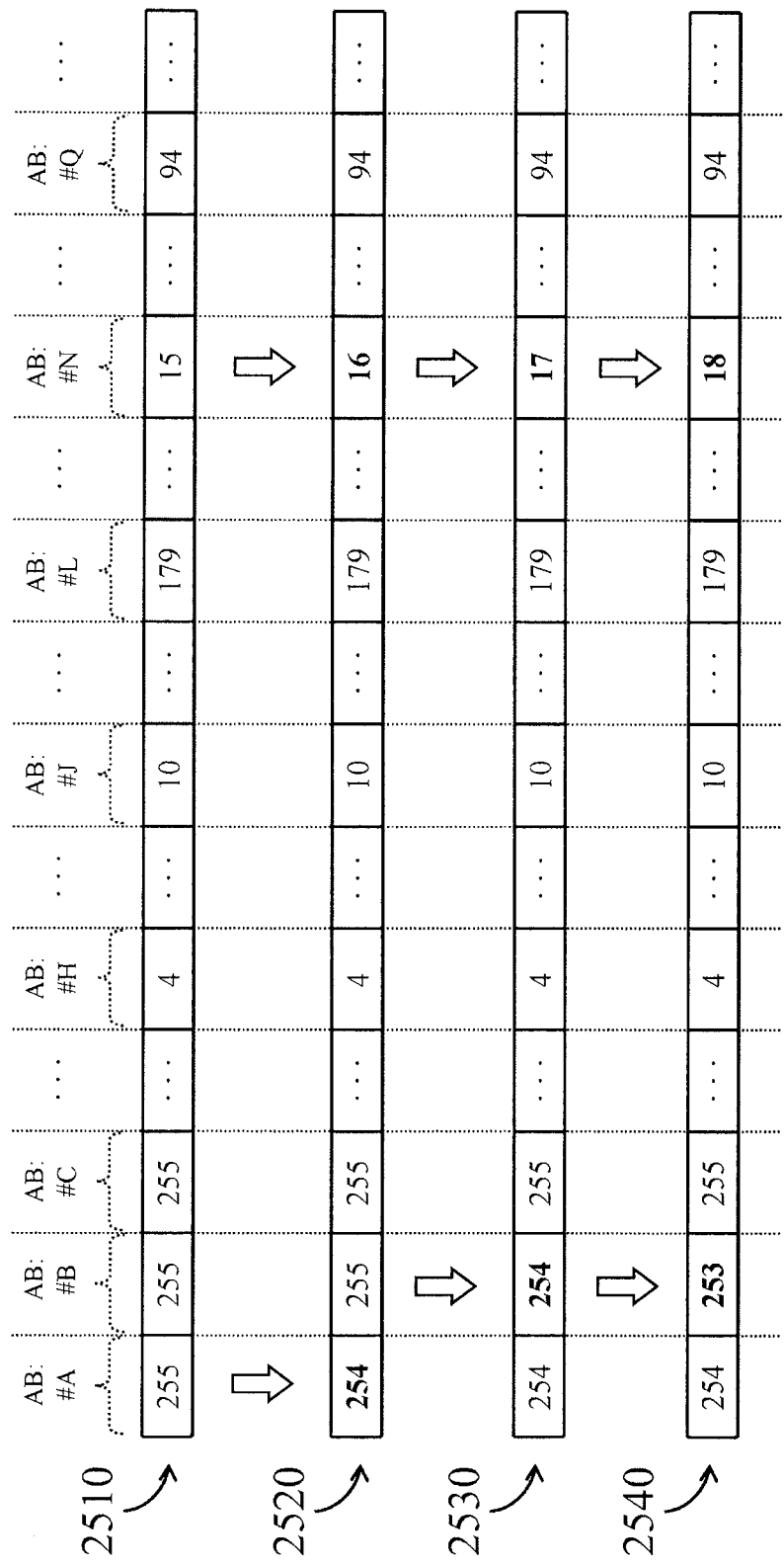
FIG. 25 is a schematic diagram of address group validity tables for recording group validity information for addressing blocks in accordance with an exemplary embodiment.

During operations, the processing circuit 126 may record the valid group count for each of the addressing blocks 134 in the volatile memory 122 in order based on the block numberings to form an address group validity table 2510 as illustrated in FIG. 25. In the embodiment of FIG. 25, the processing circuit 126 records the valid group count of the first addressing block 134A in the first position of the address group validity table 2510, records the valid group count of the second addressing block 134B in the second position of the address group validity table 2510, records the valid group count of the third addressing block 134C in the third position of the address group validity table 2510, and so forth. Thus, the address group validity information for the 14th addressing block 134N would be recorded in the 14th position of the address group validity table 2510.

In operation 2420, the processing circuit 126 determines whether it needs to update address group validity information for any addressing block 134. Once the processing circuit 126 finished an updating operation on a particular address group, the processing circuit 126 would determine that the address group validity information for an addressing block, in which the particular address group was originally stored, needs to be updated. The processing circuit 126 would also determine that the address group validity information for an addressing block, in which the particular address group is latest stored, needs to be updated. Accordingly, once the processing circuit 126 finished the updating operation on a particular address group, the processing circuit 126 proceeds to operation 2430.

In the operation 2430, the processing circuit 126 updates address group validity information for related addressing blocks. Take the aforementioned case illustrated in FIG. 20, where the address group G1 is updated by the processing circuit 126, as an example. In this case, the processing circuit 126 updates the address group G1 originally stored in the physical page #1 of the addressing block 134A, records the updated address group G1 in the physical page #15 of the addressing block 134N, and updates the allocation information for the address group G1 correspondingly. The updated allocation information for the address group G1 renders the original content of address group G1 recorded in the physical page #1 of the addressing block 134A invalid. This updating operation on the address group G1 not only changes the valid group count of the addressing block 134A, but also changes the valid group count of the addressing block 134N.

Therefore, the processing circuit 126 performs the operation 2430 to update the address group validity information for both addressing block 134A and addressing block 134N. As illustrated in FIG. 25, the processing circuit 126 increases the valid group count of the addressing block 134N by 1 and decreases the valid group count of the addressing block 134A by 1 to form a new address group validity table 2520.

Take the aforementioned case illustrated in FIG. 21, where the address group G255 is updated by the processing circuit 126, as another example. In this case, the processing circuit 126 updates the address group G255 originally stored in the physical page #0 of the addressing block 134B, records the updated address group G255 in the physical page #16 of the addressing block 134N, and updates the allocation information for the address group G255 correspondingly. The updated allocation information for the address group G255 renders the original content of address group G255 recorded in the addressing block 134B invalid. This updating operation on the address group G255 not only changes the valid group count of the addressing block 134B, but also changes the valid group count of the addressing block 134N.

Therefore, the processing circuit 126 performs the operation 2430 to update the address group validity information for both addressing block 134B and addressing block 134N. As illustrated in FIG. 25, the processing circuit 126 increases the valid group count of the addressing block 134N by 1 and decreases the valid group count of the addressing block 134B by 1 to form a new address group validity table 2530.

Figure 23:
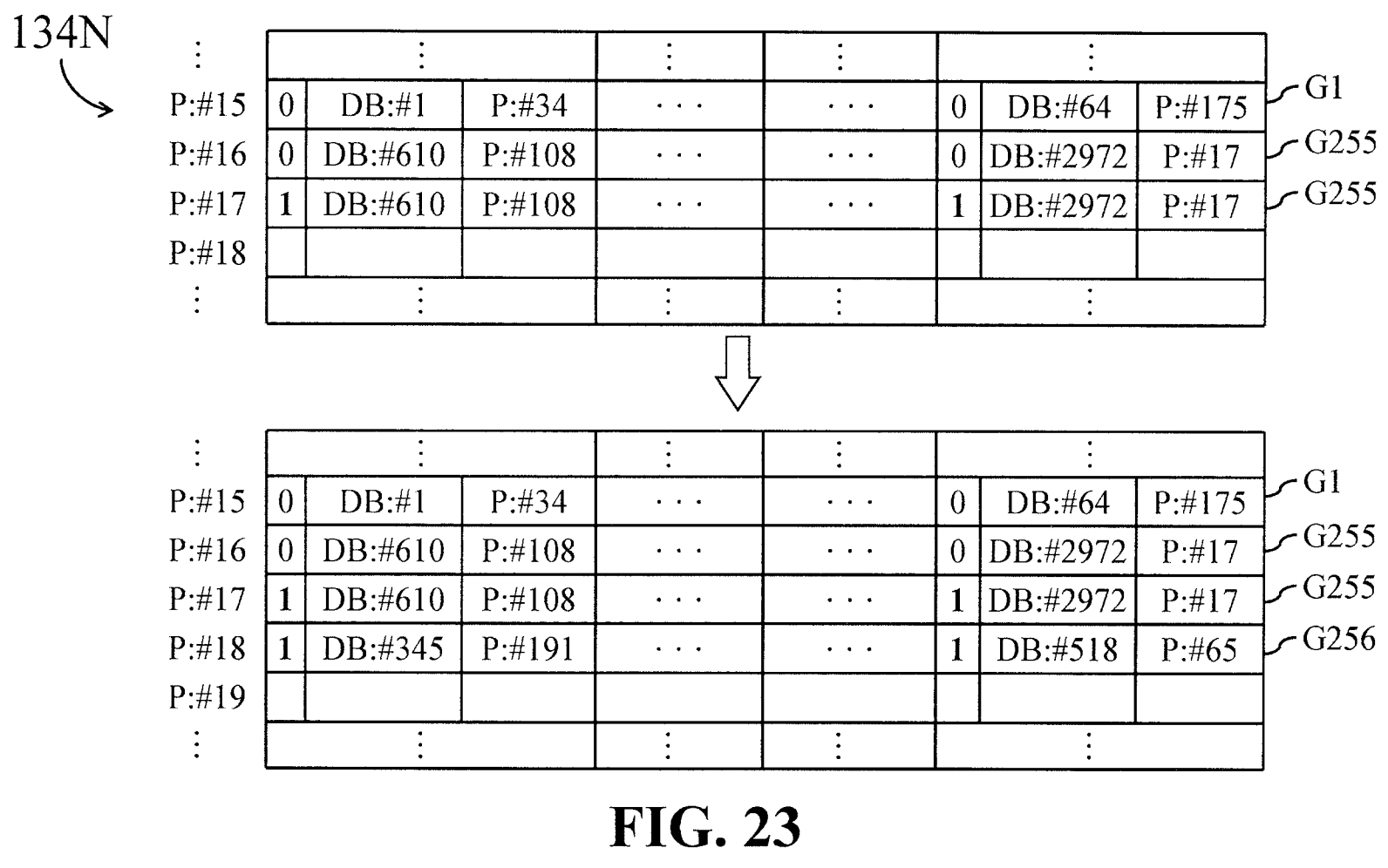

Take the aforementioned erase operations illustrated in FIG. 23, where the address groups G255 and G256 are updated by the processing circuit 126, as another example. In this case, the processing circuit 126 updates the address group G255 originally stored in the physical page #16 of the addressing block 134N, records the updated address group G255 in the physical page #17 of the addressing block 134N, and updates the allocation information for the address group G255 correspondingly. Also, the processing circuit 126 updates the address group G256 originally stored in the physical page #1 of the addressing block 134B, records the updated address group G256 in the physical page #18 of the addressing block 134N, and updates the allocation information for the address group G256 correspondingly.

The updated allocation information for the address groups G255 and G256 renders the original content of address group G255 recorded in the addressing block 134N invalid and also renders the original content of address group G256 recorded in the addressing block 134B invalid. The updating operations on the address groups G255 and G256 not only changes the valid group count of the addressing block 134B, but also changes the valid group count of the addressing block 134N.

Therefore, the processing circuit 126 performs the operation 2430 to update the address group validity information for both addressing block 134B and addressing block 134N.

In this case, two more valid address groups G255 and G256 are added into the addressing block 134N, but the original address group G255 stored in the physical page #16 of the addressing block 134N becomes invalid. As a result, the total valid group count of the addressing block 134N is only increased by 1, so the processing circuit 126 decreases the valid group count of the addressing block 134B by 1 and increases the valid group count of the addressing block 134N by 1 to form a new address group validity table 2540 as shown in FIG. 25.

To prevent the address group validity information for the addressing blocks 134 from being lost after powered off, the processing circuit 126 may write the address group validity table currently buffered in the volatile memory 122 into another management block 136, such as a management block 136B (not shown) every time an addressing block 134 is filled with address groups.

Figure 26:
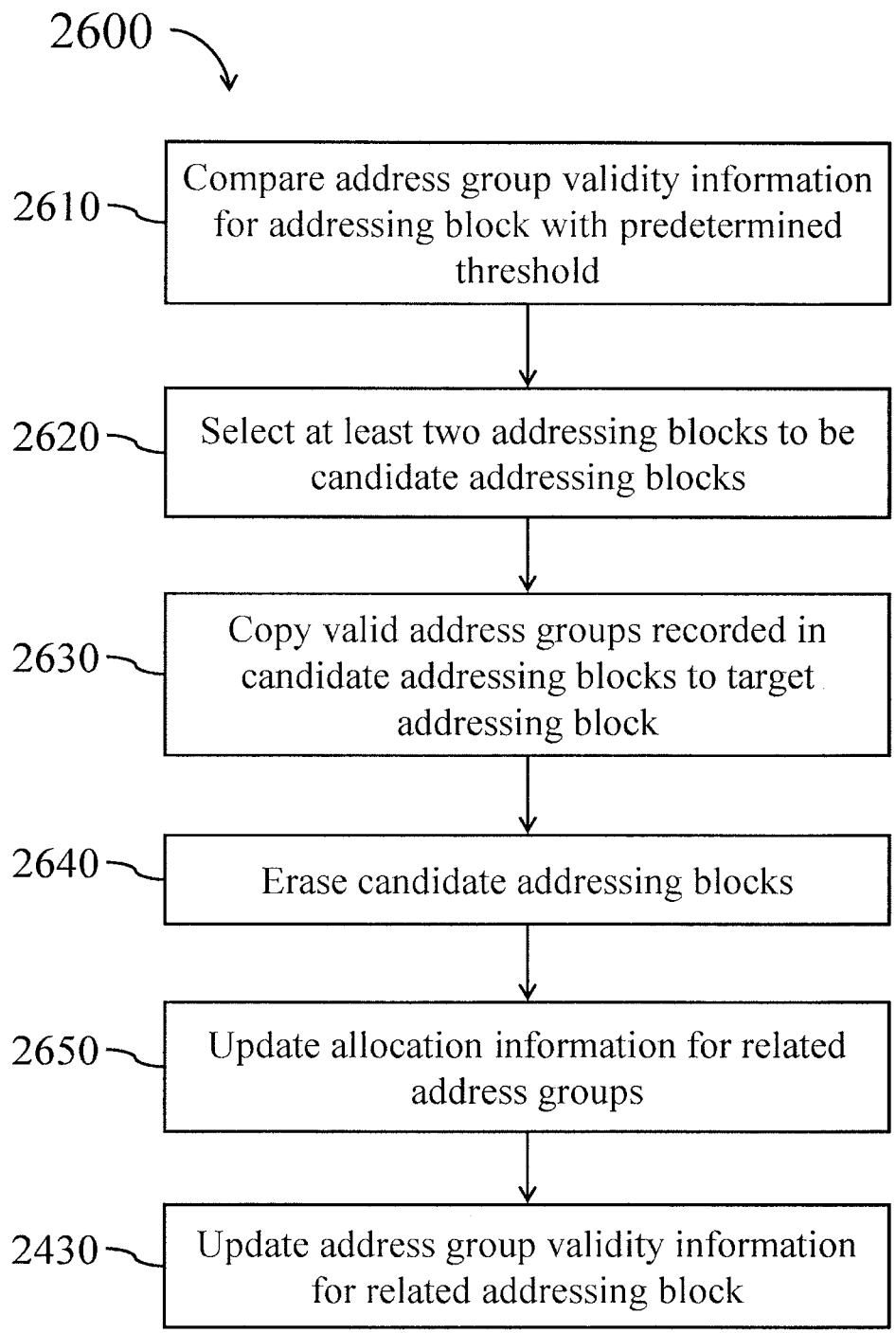
FIG. 26 is a simplified flowchart illustrating a method for cleaning addressing blocks in accordance with an exemplary embodiment.

Please refer to FIG. 26, which shows a simplified flowchart 2600 illustrating a method for cleaning addressing blocks in accordance with an exemplary embodiment.

During operations, the processing circuit 126 may perform operation 2610 at appropriate time to compare the address group validity information for each addressing block 134 with a predetermined threshold TH1. For example, the processing circuit 126 may conduct the operation 2610 intermittently or conduct the operation 2610 when the host device 110 does not access the flash memory module 130 too frequently.

In operation 2620, the processing circuit 126 selects at least two addressing blocks 134 to be candidate addressing blocks according to the comparing results obtained in the operation 2610. The processing circuit 126 may select addressing blocks 134 whose valid group count is less than the predetermined threshold TH1 as candidate addressing blocks. For the purpose of explanatory convenience in the following description, it is assumed that the predetermined threshold TH1 is 12. In the embodiment shown in FIG. 25, the processing circuit 126 would select the addressing blocks 134H and 134J as candidate addressing blocks as their valid group counts are less than 12.

In operation 2630, the processing circuit 126 copies valid address groups recorded in candidate addressing blocks 134H and 134J to a target addressing block with sufficient available physical pages for storing those valid address groups. For the purpose of explanatory convenience in the following description, it is assumed that the processing circuit 126 selects an addressing block 134P as the target addressing block. The operation of copying the valid address groups from the candidate addressing blocks 134H and 134J to the target addressing block 134P is similar to the operation 1560 of the flowchart 1500 described previously.

In operation 2640, the processing circuit 126 controls the flash memory module 130 to conduct erasing operations on the candidate addressing blocks 134H and 134J to release the memory space of these addressing blocks for later use.

In operation 2650, the processing circuit 126 updates the allocation information for those valid address groups that are copied from the candidate addressing blocks 134H and 134J to the target addressing block 134P. The operation of updating the allocation information for the valid address groups currently stored in the target addressing block 134P is principally similar to the operation 1570 of the flowchart 1500 described previously. Accordingly, the processing circuit 126 would write the new physical addresses, in which the valid address groups of the addressing blocks 134P are stored, into the management block 136A to form an updated address group allocation table.

Then, the processing circuit 126 performs the operation 2430 to update address group validity information for related addressing blocks. The operation 2430 of the flowchart 2600 is principally the same as the operation 2430 of the flowchart 2400. In this case, the processing circuit 126 would update address group validity information for the addressing blocks 134H, 134J, and 134P.

The executing order of the operations in the flowchart 2600 described above is merely an example rather than a restriction of the practical implementations. For example, the operations 2640, 2650, and 2430 of the flowchart 2600 can be executed simultaneously or in any sequence.

In addition, the predetermined threshold TH1 used in the operation 2610 may be adaptively adjusted according to the block usage situation of the flash memory module 130. In one embodiment, the processing circuit 126 may adaptively adjust the predetermined threshold TH1 from time to time according to a total valid group count of all addressing blocks 134. For example, the processing circuit 126 may increase the value of TH1 when the total valid group count of all addressing blocks 134 is less than a first predetermined level and decrease the value of TH1 when the total valid group count of all addressing blocks 134 is greater than a second predetermined level.

In another embodiment, the processing circuit 126 may adaptively adjust the predetermined threshold TH1 according to the quantity of available blocks in the flash memory module 130, wherein the available blocks may be referred to data blocks 132 or addressing blocks 134 or the combination of both. For example, the processing circuit 126 may increase the value of TH1 when the quantity of available data blocks 132 is less than a first predetermined quantity and decrease the value of TH1 when the quantity of available data blocks 132 is greater than a second predetermined quantity. Similarly, the processing circuit 126 may increase the value of TH1 when the quantity of available addressing blocks 134 is less than a third predetermined quantity and decrease the value of TH1 when the quantity of available addressing blocks 134 is greater than a fourth predetermined quantity.

To prevent the address group validity information for the addressing blocks 134 from being lost after powered off, the processing circuit 126 may write the address group validity table currently buffered in the volatile memory 122 into the management block 136B when the cleaning operation for the addressing blocks 134 is finished.

In the foregoing embodiments, the processing circuit 126 uses the valid group count of a particular addressing block 134 to represent the address group validity information for the particular addressing block 134. This is merely an embodiment rather than a restriction for the practical operations. For example, the processing circuit 126 in another embodiment may instead use an invalid group count to represent the address group validity information for the particular addressing block 134. In this situation, the comparison algorithm and parameters, such as the predetermined threshold TH1, employed in the flowchart 2600 may need to be adjusted correspondingly.

As can be seen from the foregoing, since there is no pairing structure for the addressing blocks 134 in this embodiment, the controller 120 therefore has more freedom on selecting addressing blocks to be cleaned. Accordingly, unnecessary cleaning operations on addressing blocks may be avoided. As a result, the frequency of block erasing operations for the flash memory module 130 can be further reduced, thereby improving the accessing performance of the flash memory module 130.

In the foregoing embodiments, the address mapping information recorded in each address group by processing circuit 126 are actual physical addresses of memory pages. This is merely an exemplary embodiment, rather than a restriction of the implementations. For example, the processing circuit 126 may first convert the physical addresses of the flash memory into corresponding virtual addresses, such as virtual page numberings, and then group those virtual addresses into multiple address groups. As a result, the address mapping information contained in each address group are virtual addresses in this case. Therefore, the address mapping information contained in each address group may be physical addresses or any kind of virtual addresses.

The methods for maintaining and updating address mapping information for logical addresses and methods for translating a logical address into a corresponding physical address are illustrated above. As can be seen from the foregoing descriptions, the processing circuit 126 may adopt different approaches to manage and update address mapping information by using the addressing blocks 134 and management blocks 136. In the following, the cleaning operation for the data blocks 132 will be explained in further detail with reference to FIG. 27 through FIG. 29. Similar to the operations of cleaning the addressing blocks 134 illustrated above, the processing circuit 126 of this embodiment may monitor the validity situation of content stored in the physical pages of the data blocks 132 and determine whether to clean a particular data block 132 based on the validity situation of content stored in the particular data block 132.

Figure 27:
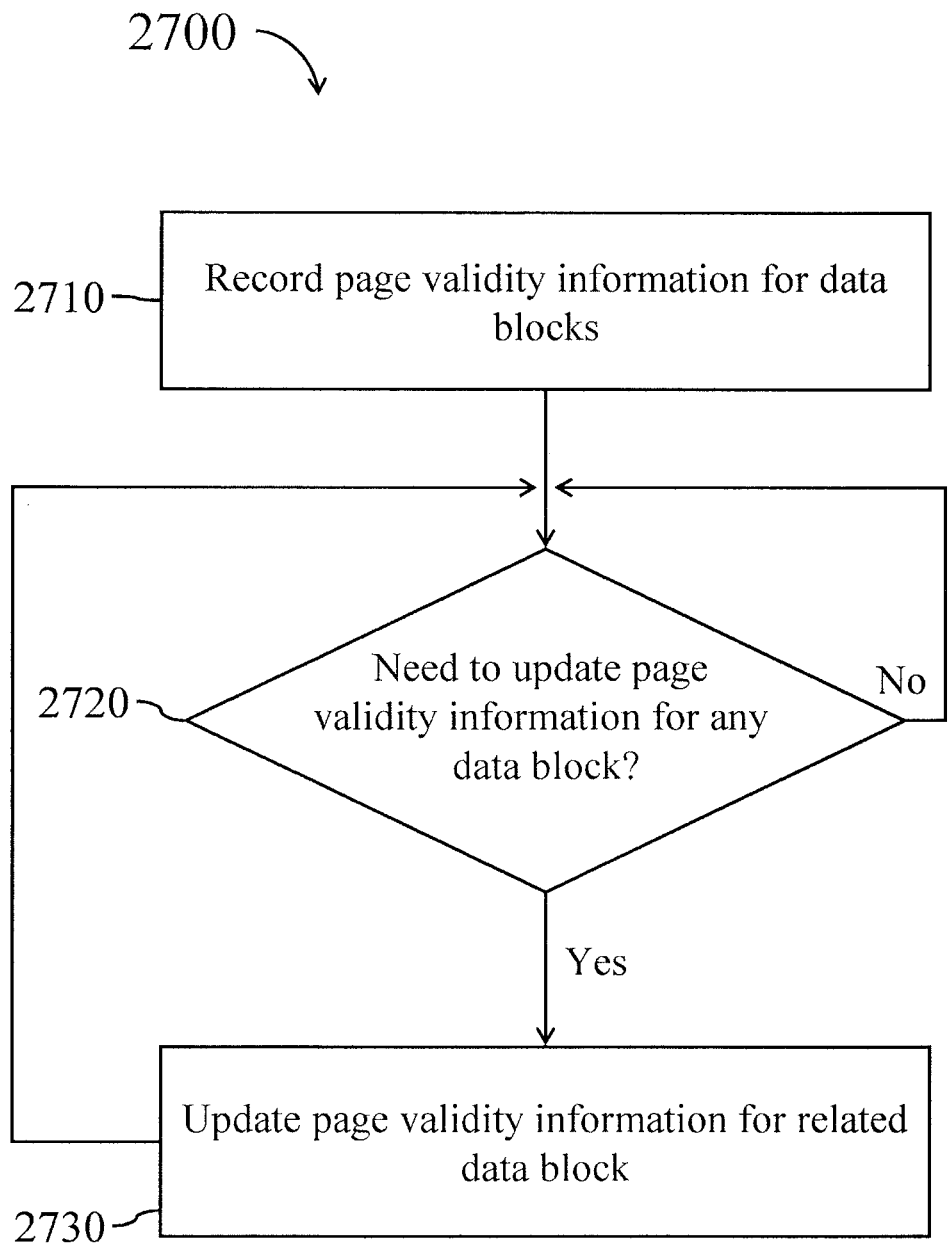
FIG. 27 is a simplified flowchart illustrating a method for monitoring page validity situation of data blocks in accordance with an exemplary embodiment.

Please refer to FIG. 27, which shows a simplified flowchart 2700 illustrating a method for monitoring page validity situation of data blocks 132 in accordance with an exemplary embodiment.

In operation 2710, the processing circuit 126 records page validity information for each of the data blocks 132 and temporarily stores in the volatile memory 122. In this embodiment, the processing circuit 126 may use a valid page count of a particular data block 132 to represent the page validity information for the particular data block 132. Thus, when the physical pages of the particular data block 132 are filled with valid data and logical addresses, the maximum valid page count of the particular data block 132 is 255 as the last page of each data block 132 is reserved for storing a logical address sequence as shown in FIG. 2.

The processing circuit 126 may calculate the valid page count of a particular data block 132 by inquiring the address mapping information stored in the corresponding valid address groups at the time based on the logical address sequence stored in the particular data block 132. Take the aforementioned case, where the processing circuit 126 just recorded the logical address sequence in the target page of the data block 132A as illustrated in FIG. 2, as an example. At that time, as described above, the processing circuit 126 could easily obtain all the logical addresses L1, L5, . . . , Li stored in the data block 132A and the physical pages, in which those logical addresses are respectively stored, based on the logical address sequence stored in the target page of the data block 132A. The processing circuit 126 may obtain a first address mapping information for a particular logical address stored in the data block 132A based on the logical address sequence stored in the target page of the data block 132A, and perform the address translation methods as described in FIG. 10 or FIG. 19 to obtain a second address mapping information for the particular logical address from a corresponding address group. If the first address mapping information is identical to the second address mapping information, then the processing circuit 126 would determine that a physical page of the data block 132A for storing the particular logical address is a valid page. Otherwise, the processing circuit 126 would determine that physical page of the data block 132A is an invalid page.

Therefore, the processing circuit 126 may calculate the valid page count of the data block 132A by respectively comparing the address mapping information for logical addresses L1, L5, . . . , Li obtained from the logical address sequence stored in the data block 132A with the address mapping information for those logical addresses L1, L5, . . . , Li recorded in the corresponding address groups. For example, the processing circuit 126 may set an initial valid page count of the data block 132A to 0 and increase the valid page count by 1 once the address mapping information for a particular logical address obtained from the logical address sequence stored in the data block 132A is found matching with the address mapping information for the particular logical address obtained from the corresponding address group. Then the processing circuit 126 repeats the address mapping information comparison for a next logical address. Alternatively, the processing circuit 126 may set an initial valid page count of the data block 132A to 255, decrease the valid page count by 1 once the address mapping information for a particular logical address obtained from the logical address sequence stored in the data block 132A is not found matching with the address mapping information for the particular logical address obtained from the corresponding address group, and then repeat the address mapping information comparison for a next logical address.

Figure 28:
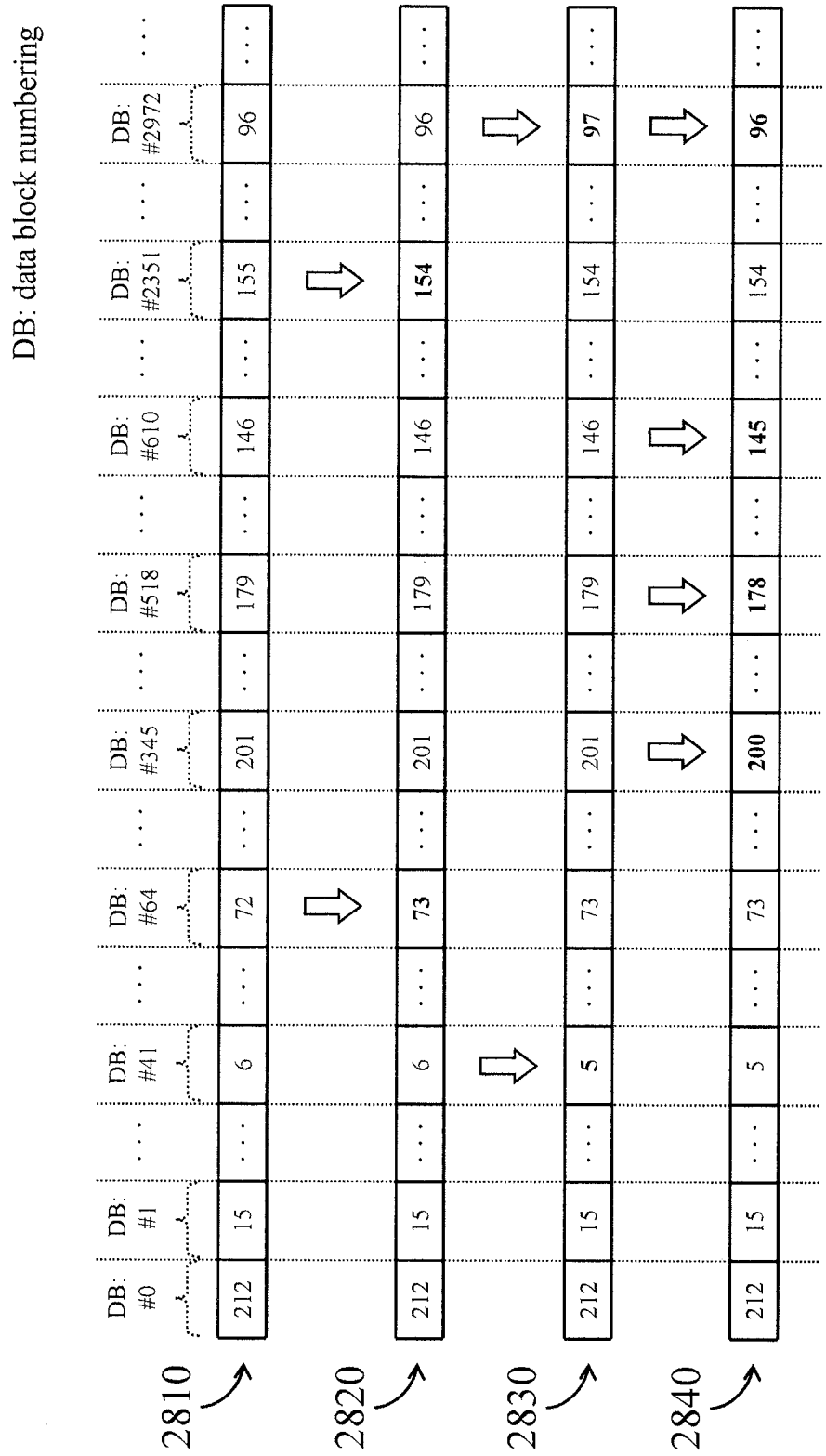
FIG. 28 is a schematic diagram of page validity tables for storing page validity information for data blocks in accordance with an exemplary embodiment.

During operations, the processing circuit 126 may record the valid page count for each of the data blocks 132 in the volatile memory 122 in an order based on the block numberings to form a page validity table 2810 as illustrated in FIG. 28. In the embodiment of FIG. 28, the processing circuit 126 records the valid page count of the first data block #0 in the first position of the page validity table 2810, records the valid page count of the second data block #1 in the second position of the page validity table 2810, records the valid page count of the third data block #2 in the third position of the page validity table 2810, and so forth. Thus, the page validity information for the 346th data block, i.e., the data block #345, would be recorded in the 346th position of the page validity table 2810.

In operation 2720, the processing circuit 126 determines whether it needs to update page validity information for any data block 132. Once the processing circuit 126 finished a data updating operation for a particular logical address, the processing circuit 126 would determine that the page validity information for a data block, in which the particular logical address was originally stored, needs to be updated. Additionally, the processing circuit 126 would also determine that the page validity information for a data block, in which the particular logical address is latest stored, needs to be updated.

Accordingly, once the processing circuit 126 finished the data updating operation for a particular logical address, the processing circuit 126 performs operation 2730 to update page validity information for related data blocks.

Take the aforementioned case illustrated in FIG. 11 or FIG. 20, where the processing circuit 126 writes new data with respect to the logical address 4095 into the physical page #175 of the data block #64, as an example. In this case, the processing circuit 126 writes the updated data into the physical page #175 of the data block #64, updates the address mapping information for the logical address 4095, and updates the allocation information for the address group G1 correspondingly as described previously. The data updating operation for the logical address 4095 renders the original data recorded in the physical page #37 of the data block #2351 invalid. This data updating operation for the logical address 4095 not only changes the valid page count of the data block #2351, but also changes the valid page count of the data block #64.

Therefore, the processing circuit 126 performs the operation 2730 to update the page validity information for both data block #2351 and data block #64. As illustrated in FIG. 28, the processing circuit 126 increases the valid page count of the data block #64 by 1 and decreases the valid page count of the data block #2351 by 1 to form a new page validity table 2820.

Take the aforementioned case illustrated in FIG. 12 or FIG. 21, where the processing circuit 126 writes new data with respect to the logical address 524287 into the physical page #17 of the data block #2972, as another example. In this case, the processing circuit 126 writes the updated data into the physical page #17 of the data block #2972, updates the address mapping information for the logical address 524287, and updates the allocation information for the address group G255 correspondingly as described previously. The data updating operation for the logical address 524287 renders the original data recorded in the physical page #88 of the data block #41 invalid. This data updating operation for the logical address 524287 not only changes the valid page count of the data block #2972, but also changes the valid page count of the data block #41.

Therefore, the processing circuit 126 performs the operation 2730 to update the page validity information for both data block #2972 and data block #41. As illustrated in FIG. 28, the processing circuit 126 increases the valid page count of the data block #2972 by 1 and decreases the valid page count of the data block #41 by 1 to form a new page validity table 2830.

Take the aforementioned case illustrated in FIG. 14 or FIG. 23, where the host device 110 requests to erase (or delete) data with respect to logical addresses 522240~526335, as yet another example. In this case, the processing circuit 126 sets the data validity marks of all address mapping information in the address group G255 to 1, sets the data validity marks of all address mapping information in the address group G256 to 1, and updates the allocation information for the address groups G255 and G256 as described previously.

The data erasing operation for the logical addresses 522240~526335 renders the original data recorded in the physical pages mapping to the logical addresses 522240~526335 invalid. For example, this data erasing operation renders the original data recorded in the physical page #108 of data block #610, the physical page #17 of data block #2972, the physical page #191 of data block #345, and the physical page #65 of data block #518 invalid. Thus, this data erasing operation for the logical addresses 522240~526335 changes the valid page count of the data block #610, the valid page count of the data block #2972, the valid page count of the data block #345, the valid page count of the data block #518, and the valid page counts of other data blocks related to the address groups G255 and G256.

Therefore, the processing circuit 126 performs the operation 2730 to update the page validity information for the data blocks related to the address groups G255 and G256. For example, as illustrated in FIG. 28, the processing circuit 126 decreases the valid page count of the data block #345 by 1, decreases the valid page count of the data block #518 by 1, decreases the valid page count of the data block #610 by 1, decreases the valid page count of the data block #2972 by 1, and decreases each of the valid page counts of other data blocks related to the address groups G255 and G256 by 1 to form a new page validity table 2840.

To prevent the page validity information for the data blocks 132 from being lost after powered off, the processing circuit 126 may write the page validity table currently buffered in the volatile memory 122 into a management block 136B every time a data block 132 is filled with data and logical addresses.

Figure 29:
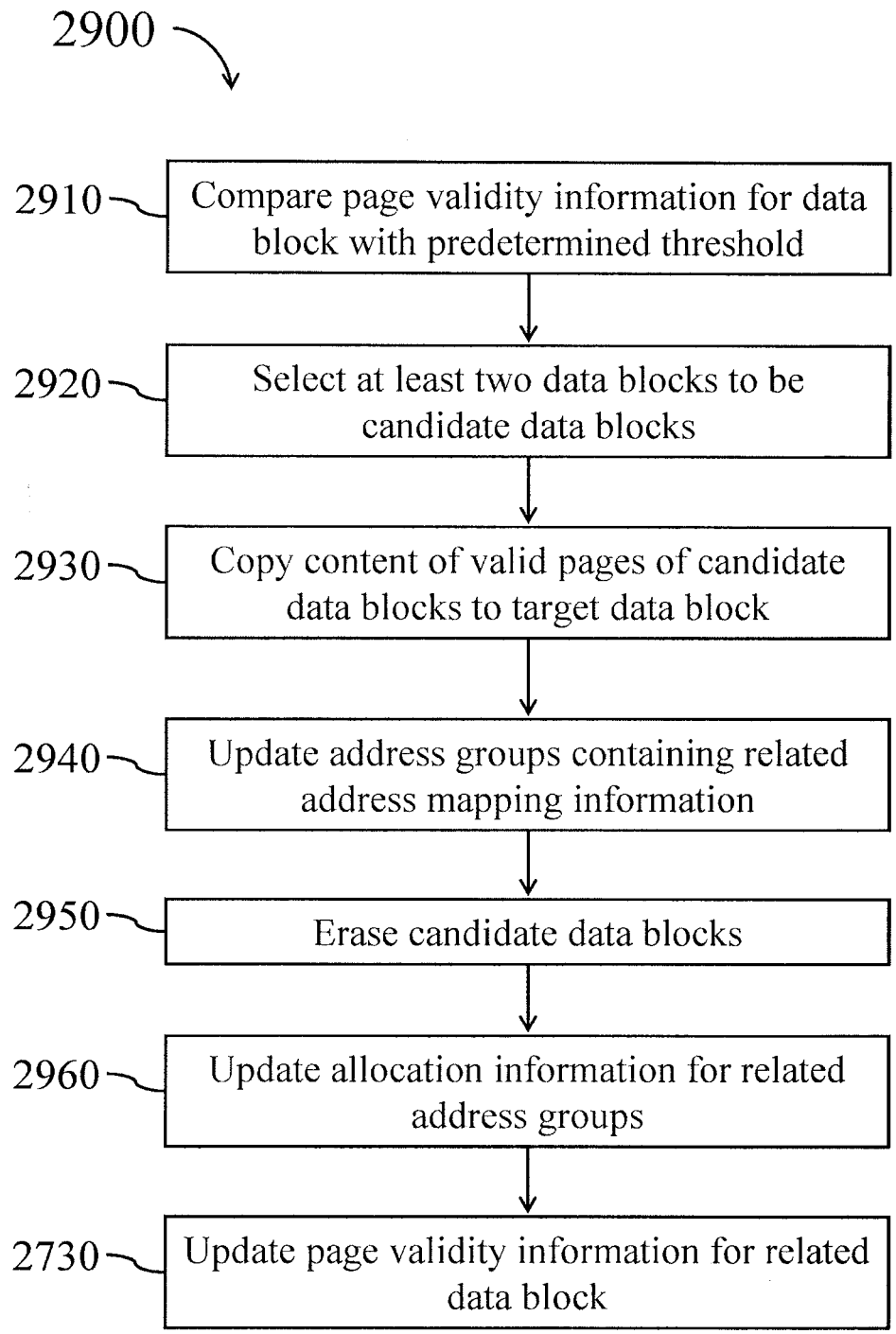
FIG. 29 is a simplified flowchart illustrating a method for cleaning data blocks in accordance with an exemplary embodiment.

Please refer to FIG. 29, which shows a simplified flowchart 2900 illustrating a method for cleaning data blocks in accordance with an exemplary embodiment.

During operations, the processing circuit 126 may perform operation 2910 at appropriate time to compare the page validity information for each data block 132 with a predetermined threshold TH2. For example, the processing circuit 126 may conduct the operation 2910 intermittently or conduct the operation 2910 when the host device 110 does not access the flash memory module 130 too frequently.

In operation 2920, the processing circuit 126 selects at least two data blocks 132 to be candidate data blocks according to the comparing results obtained in the operation 2910. The processing circuit 126 may select data blocks 132 whose valid page count is less than the predetermined threshold TH2 as candidate data blocks. For the purpose of explanatory convenience in the following description, it is assumed that the predetermined threshold TH2 is 20. In the embodiment shown in FIG. 28, the processing circuit 126 would select the data block #1 and the data block #41 as candidate data blocks as their valid page counts are less than 20.

In operation 2930, the processing circuit 126 copies content stored in valid pages of the candidate data block #1 and data block #41 to a target data block with sufficient available physical pages for storing those valid contents. For the purpose of explanatory convenience in the following description, it is assumed that the processing circuit 126 selects a data block #809 as the target data block. Accordingly, the processing circuit 126 copies the content stored in the valid pages of the candidate data block #1 and data block #41 to the available physical pages of the target data block #809.

Since the operation 2930 changes the address mapping of physical addresses onto those logical addresses originally stored in the valid pages of the candidate data blocks #1 and #41, the processing circuit 126 performs operation 2940 to update address groups containing related address mapping information for those logical addresses. In implementations, the processing circuit 126 may adopt the approach as illustrated in the operation 650 of the flowchart 600 to update the related address groups. Alternatively, the processing circuit 126 may adopt the approach as illustrated in the operation 1560 of the flowchart 1500 to update the related address groups.

In operation 2950, the controller 120 controls the flash memory module 130 to conduct erasing operations on the candidate data blocks #1 and #41 to release the memory space of these data blocks.

In operation 2960, the processing circuit 126 updates the allocation information for the related address groups updated in the operation 2940. In implementations, the processing circuit 126 may adopt the approach as illustrated in the operation 660 of the flowchart 600 to update the allocation information for the related address groups. Alternatively, the processing circuit 126 may adopt the approach as illustrated in the operation 1570 of the flowchart 1500 to update the allocation information for the related address groups.

Then, the processing circuit 126 performs the operation 2730 to update page validity information for related data blocks. The operation 2730 of the flowchart 2900 is principally the same as the operation 2730 of the flowchart 2700. In this case, the processing circuit 126 would update page validity information for the data blocks #1, #41, and #809.

The executing order of the operations in the flowchart 2900 described above is merely an example rather than a restriction of the practical implementations. For example, the operations 2940, 2950, 2960, and 2730 of the flowchart 2900 can be executed simultaneously or in any sequence.

In addition, the predetermined threshold TH2 used in the operation 2910 may be adaptively adjusted according to the block usage situation of the flash memory module 130. In one embodiment, the processing circuit 126 may adaptively adjust the predetermined threshold TH2 from time to time according to a total valid page count of all data blocks 132. For example, the processing circuit 126 may increase the value of TH2 when the total valid page count of all data blocks 132 is less than a third predetermined level and decrease the value of TH2 when the total valid page count of all data blocks 132 is greater than a fourth predetermined level.

In another embodiment, the processing circuit 126 may adaptively adjust the predetermined threshold TH2 according to the quantity of available blocks in the flash memory module 130, wherein the available blocks may be referred to data blocks 132 or addressing blocks 134 or the combination of both. For example, the processing circuit 126 may increase the value of TH2 when the quantity of available data blocks 132 is less than a fifth predetermined quantity and decrease the value of TH2 when the quantity of available data blocks 132 is greater than a sixth predetermined quantity. Similarly, the processing circuit 126 may increase the value of TH2 when the quantity of available addressing blocks 134 is less than a seventh predetermined quantity and decrease the value of TH2 when the quantity of available addressing blocks 134 is greater than an eighth predetermined quantity.

To prevent the page validity information for the data blocks 132 from being lost after powered off, the processing circuit 126 may write the page validity table currently buffered in the volatile memory 122 into the management block 136B when the cleaning operation for the data blocks 132 is finished.

As can be seen from the foregoing, the processing circuit 126 keep monitoring the page validity information for each data block and selects data blocks to be cleaned based on their page validity information, regardless the selected data blocks are of the same data writing group or not. Accordingly, the data blocks of the same data writing group, such as the data block 132A, 132B, 132C, and 132D shown in FIG. 2, can be erased independently. In this embodiment, if the processing circuit 126 selects one data block of a particular data writing group and another data block not within the particular data writing group to be candidate data blocks in the operation 2920, the processing circuit 126 only cleans the two selected candidate data blocks and would not erase the other data blocks of the particular data writing group together with the selected candidate data blocks. That is, after erasing the candidate data blocks, the processing circuit 126 may write data and associated logical addresses into the available physical pages of the other data blocks of the particular data writing groups without erasing these data blocks in advance.

In this way, the controller 120 is allowed to have more freedom on selecting data blocks to be cleaned, and thus unnecessary cleaning operations on data blocks, such as erasing the other data blocks of the particular data writing group together with the selected candidate data blocks, may be avoided. As a result, the disclosed management mechanism for address mapping information and methods for cleaning addressing blocks and data blocks not only effectively reduce the frequency of block erasing operations for the flash memory module 130, but also effectively reduce the amount of blocks needed to be cleaned in a short period by the controller 120. Accordingly, the accessing speed of the flash memory module 130 can be greatly improved. For example, the disclosed management mechanism for address mapping information and methods for cleaning addressing blocks and data blocks is able to increase the speed of accessing a flash memory module made by TLC chips to meet Class 6 accessing speed requirement.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A controller for managing a flash memory module, comprising:
    a processing circuit configured for recording a plurality of address groups into a plurality of addressing blocks, wherein the processing circuit writes each address group into a physical page of one of the plurality of addressing blocks, and each of the plurality of address groups containing a plurality of address mapping information respectively corresponding to a plurality of sequential logical addresses; and
    a communication interface for coupling with the processing circuit for receiving a write command with respect to a target logical address from a host device;
    wherein the processing circuit writes the target logical address and associated data into a destination page of a target data block, retrieves the address mapping information for the target logical address from the plurality of address groups, updates the retrieved address mapping information based on physical location information of the destination page of the target data block, and writes a target address group containing updated address mapping information for the target logical address into a target page of a target addressing block,
    wherein the processing circuit records N group numberings of N address groups stored in a first addressing block in a physical page of the first addressing block, and
    wherein the processing circuit is further configured for:
        setting an initial valid group count of the first addressing block;
        comparing recorded allocation information for the N address groups with allocation information for the N address groups obtained based on the N group numberings; and
        adjusting the initial valid group count based on the comparing results to obtain a valid group count of the first addressing block.

2. A controller for accessing a flash memory module, comprising:
    a communication interface for coupling with a host device; and
    a processing circuit coupled with the communication interface and configured for interleaving a plurality of logical addresses into a plurality of data blocks of a data writing group;

wherein every time the processing circuit writes one of the plurality of logical addresses into one data block of the data writing group, the processing circuit writes a next one of the plurality of logical addresses into another data block of the data writing group; and wherein after erasing a first data block of the data writing group, the processing circuit writes data into a second data block of the data writing group without erasing the second data block in advance.

3. The controller of claim 2, wherein the processing circuit is further configured for:

writing a first logical address of the plurality of logical addresses into a first page of the first data block;

after writing the first logical address into the first page of the first data block, writing a second logical address of the plurality of logical addresses into a first page of the second data block; and after writing the second logical address into the first page of the second data block, writing a third logical address of the plurality of logical addresses into a second page of the first data block.

4. The controller of claim 2, wherein the processing circuit stores content of valid pages of the first data block and a third data block into a target data block before erasing the first data block;

wherein the third data block and the target data block are not within the data writing group.

5. The controller of claim 2, wherein the processing circuit records page validity information of the first data block and the second data block into a second management block.

6. The controller of claim 5, wherein the processing circuit compares page validity information of the first data block with a predetermined threshold, and determines whether to erase the first data block according to the comparing results.

7. The controller of claim 6, wherein the processing circuit adaptively adjusts the predetermined threshold according to block usage situation of the flash memory module.

8. The controller of claim 7, wherein the processing circuit adaptively adjusts the predetermined threshold according to a total valid page count of a plurality of data blocks.

9. The controller of claim 7, wherein the processing circuit adaptively adjusts the predetermined threshold according to the quantity of available blocks in the flash memory module.

10. The controller of claim 5, wherein the processing circuit is further configured for:

recording N logical addresses stored in the first data block, in a target page of the first data block;

recording address mapping information for the N logical addresses;

writing updated data with respect to a target logical address of the N logical addresses into a destination page of a destination data block; and updating address mapping information for the target logical address according to physical location information of the destination page of the destination data block.

11. The controller of claim 10, wherein the processing circuit is further configured for:

setting an initial valid page count of the first data block;

comparing recorded address mapping information for the N logical addresses with address mapping information obtained based on the N logical addresses; and adjusting the initial valid page count based on the comparing results to obtain the page validity information of the first data block.

* * * * *